US011341852B2

(12) United States Patent
Itou

(10) Patent No.: US 11,341,852 B2
(45) Date of Patent: May 24, 2022

(54) DANGEROUS ACT RESOLUTION SYSTEM, APPARATUS, METHOD, AND PROGRAM

(71) Applicant: NEC Corporation, Tokyo (JP)

(72) Inventor: Kousaku Itou, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/970,502

(22) PCT Filed: Feb. 25, 2019

(86) PCT No.: PCT/JP2019/006973
§ 371 (c)(1),
(2) Date: Aug. 17, 2020

(87) PCT Pub. No.: WO2019/163980
PCT Pub. Date: Aug. 29, 2019

(65) Prior Publication Data
US 2021/0082286 A1    Mar. 18, 2021

(30) Foreign Application Priority Data
Feb. 26, 2018    (JP) .............................. JP2018-032423

(51) Int. Cl.
*G08G 1/16*    (2006.01)
*B60Q 9/00*    (2006.01)
*G08G 1/01*    (2006.01)

(52) U.S. Cl.
CPC ............. *G08G 1/166* (2013.01); *B60Q 9/008* (2013.01); *G08G 1/0104* (2013.01)

(58) Field of Classification Search
CPC ....... G08G 1/166; G08G 1/0104; B60Q 9/008
See application file for complete search history.

(56) References Cited

U.S. PATENT DOCUMENTS 6,307,484 B1    10/2001    Sasaki et al.
6,768,944 B2 *    7/2004    Breed ................... B60W 40/06
                                                        701/301

(Continued)

FOREIGN PATENT DOCUMENTS

JP    H11-053694 A    2/1999
JP    H11-298853 A    10/1999

(Continued)

OTHER PUBLICATIONS

International Search Report for PCT Application No. PCT/JP2019/006973, dated Apr. 9, 2019.

*Primary Examiner* — Hoi C Lau
(74) *Attorney, Agent, or Firm* — Sughrue Mion, PLLC

(57) ABSTRACT

A dangerous act resolution apparatus comprises: an acquisition part that acquires peripheral vehicle specific information; a position detection part that detects a position of the vehicle; a vehicle-to-vehicle distance measurement part that measures a vehicle-to-vehicle distance; a travel speed measurement part that measures a travel speed of the vehicle; a travel direction detection part that detects a travel direction of the vehicle; and a dangerous act detection part that judges that a dangerous act occurs when a situation in which the vehicle-to-vehicle distance is shorter than a preset first threshold and the travel speed exceeds a preset second threshold occurs within a predetermined time; and transmits dangerous act detection information according to the peripheral vehicle specific information, the position, the travel speed and the travel direction to the management center apparatus. The management center apparatus outputs the warning from the selected warning output apparatus based on dangerous act detection information.

19 Claims, 20 Drawing Sheets

(56) References Cited

U.S. PATENT DOCUMENTS

| | | | |
|---|---|---|---|
| 9,679,487 B1* | 6/2017 | Hayward | G01C 21/005 |
| 9,805,601 B1* | 10/2017 | Fields | B60T 17/22 |
| 10,026,309 B1* | 7/2018 | Nepomuceno | G08G 1/166 |
| 10,060,945 B2* | 8/2018 | Steurer | G01C 3/08 |
| 10,482,226 B1* | 11/2019 | Konrardy | B60R 25/10 |
| 10,565,873 B1* | 2/2020 | Christensen | G08G 1/0965 |
| 2002/0105418 A1* | 8/2002 | Yurimoto | G08G 1/161 |
| | | | 340/436 |
| 2005/0107952 A1* | 5/2005 | Hoshino | G08G 1/0969 |
| | | | 701/431 |
| 2006/0192665 A1* | 8/2006 | Song | B60Q 1/44 |
| | | | 340/469 |
| 2007/0159354 A1* | 7/2007 | Rosenberg | G08G 1/0965 |
| | | | 340/902 |
| 2007/0198140 A1* | 8/2007 | Mudalige | G01S 19/51 |
| | | | 701/1 |
| 2011/0140874 A1* | 6/2011 | Tauchi | B60W 50/14 |
| | | | 340/438 |
| 2013/0033374 A1* | 2/2013 | Nakajima | B60L 3/00 |
| | | | 340/466 |
| 2013/0147955 A1* | 6/2013 | Oosugi | G08G 1/164 |
| | | | 348/148 |
| 2013/0162448 A1* | 6/2013 | Mochizuki | G08G 1/164 |
| | | | 340/905 |
| 2013/0229289 A1* | 9/2013 | Bensoussan | G08G 1/205 |
| | | | 340/902 |
| 2014/0118130 A1* | 5/2014 | Chang | B60Q 5/006 |
| | | | 340/435 |
| 2014/0227991 A1* | 8/2014 | Breton | G08B 25/006 |
| | | | 455/404.2 |
| 2016/0023599 A1* | 1/2016 | Jo | G08G 1/161 |
| | | | 340/903 |
| 2016/0068102 A1* | 3/2016 | Tsuzuki | B60Q 5/008 |
| | | | 340/939 |
| 2016/0082882 A1* | 3/2016 | Tsuzuki | B60Q 5/008 |
| | | | 340/425.5 |
| 2016/0140842 A1* | 5/2016 | Park | G08G 1/052 |
| | | | 340/905 |
| 2016/0163198 A1* | 6/2016 | Dougherty | G08G 1/162 |
| | | | 340/905 |
| 2016/0167580 A1* | 6/2016 | Hanita | G01S 17/93 |
| | | | 701/301 |
| 2017/0101093 A1* | 4/2017 | Barfield, Jr. | G08G 1/096775 |
| 2017/0132929 A1* | 5/2017 | Mays | G08G 1/0141 |
| 2019/0035276 A1* | 1/2019 | Zruya | H04W 4/44 |
| 2019/0172345 A1* | 6/2019 | Lin | G08G 1/0133 |

FOREIGN PATENT DOCUMENTS

| | | | |
|---|---|---|---|
| JP | 2001-328499 A | | 11/2001 |
| JP | 2005-293032 A | | 10/2005 |
| JP | 2006-205773 A | | 8/2006 |
| JP | 2006205773 A | * | 8/2006 |
| JP | 2007-072641 A | | 3/2007 |
| JP | 2007-310574 A | | 11/2007 |
| JP | 2007310574 A | * | 11/2007 |
| JP | 2008-234414 A | | 10/2008 |
| JP | 2008-296682 A | | 12/2008 |
| JP | 2013-033324 A | | 2/2013 |
| JP | 2015-087969 A | | 5/2015 |
| WO | 2017/002195 A1 | | 1/2017 |

* cited by examiner

FIG. 3

[THRESHOLD DATABASE; 12a]

|  | THRESHOLD 1 | THRESHOLD 2 | THRESHOLD 3 | THRESHOLD 4 |
|---|---|---|---|---|
| TRAVEL SPEED | 50 km/h OR LESS | 70 km/h OR LESS | 90 km/h OR LESS | 90 km/h OVER |
| VEHICLE SIZE | 4.0 cm$^2$ | 3.7 cm$^2$ | 3.5 cm$^2$ | 3.0 cm$^2$ | ies DANGEROUS ACT RESOLUTION SYSTEM, APPARATUS, METHOD, AND PROGRAM

FIELD

This application is a National Stage Entry of PCT/JP2019/006973 filed on Feb. 25, 2019, which claims priority from Japanese Patent Application 2018-032423 filed on Feb. 26, 2018, the contents of all of which are incorporated herein by reference, in their entirety.

DESCRIPTION OF RELATED APPLICATION

The present invention is based on claiming priority of Japanese Patent Application: JP2018-032423 (filed on Feb. 26, 2018), the entire contents of the application shall be incorporated and stated in the present application by reference.

The present invention relates to a dangerous act resolution system, apparatus, method, and program.

BACKGROUND

In recent years, dangerous acts such as tailgating has become a social problem, wherein tailgating means that a driver of a following vehicle drives abnormally close to a preceding vehicle. Due to such dangerous acts, damages that a driver and a fellow passenger in a preceding vehicle suffer emotional distress and accidents are increasing. There are two types as countermeasures for dangerous acts of a following vehicle, wherein the two types are a countermeasure by an instrument such as apparatus and a countermeasure by a driver of a preceding vehicle.

As a countermeasure by the instrument such as apparatus, there is taken countermeasures such that for example, a drive recorder (camera that takes video images of a following vehicle) or a dummy camera is set up at a rear end of a vehicle, or a sticker indicating that a drive recorder is set up. However, in many cases, a driver of a following vehicle who is performing a dangerous act such as tailgating does not notice the installed drive recorder or the like, so a sufficient effect by the installed drive recorder or the like cannot be obtained.

As a countermeasure by a driver of a preceding vehicle, there are taken countermeasures such that for example, the driver tries a resolution of a situation (dangerous act) by giving way to a following vehicle due to lane change, or evacuates to a safe place and reports to the third parties such as police when the situation still does not resolve. However, in situations in which the dangerous act of the following vehicle is persistently continued, the driver of the preceding vehicle may not be able to make a calm decision, and after the preceding vehicle has been forced to stop, the driver of the preceding vehicle might go out of the vehicle and suffer damage.

There is a system such that can let a third party know the situation of the driver and the vehicle and deal with it, even if a countermeasure by an instrument such as apparatus and a countermeasure by a driver of a preceding vehicle are difficult. For example, Patent Literature (PTL) 1 discloses an emergency call system terminal apparatus and an emergency call system such that an emergency call center can grasp a situation of a user and a vehicle by image data when a situation occurs in which voice conversation is impossible.
[PTL 1] Japanese Patent Kokai Publication No. JP2001-328499A

SUMMARY

The following analyses are given by the present inventor. However, in the emergency call system terminal apparatus and the emergency call system described in PTL 1, it is not possible to resolve a situation in which a dangerous act of a following vehicle is received, prior to a damage of a driver of a preceding vehicle.

It is a main object of the present invention to provide a dangerous act resolution system, apparatus, method, and program capable of contributing to resolve a situation in which a dangerous act of a peripheral vehicle is received.

Solution to Problem

According to a first aspect, a dangerous act resolution system is provided, wherein the dangerous act resolution system comprises: a warning output apparatus that outputs a warning; a management center apparatus that is communicably connected to the warning output apparatus and controls the warning output apparatus; and a dangerous act resolution apparatus that is communicably connected to the management center apparatus; is installed in a vehicle; and instructs the management center apparatus to resolve a dangerous act when a dangerous act of a peripheral vehicle traveling around the vehicle is detected. The dangerous act resolution apparatus comprises: an acquisition part that acquires peripheral vehicle specific information for specifying the peripheral vehicle; a position detection part that detects a position of the vehicle; a vehicle-to-vehicle distance measurement part that measures a vehicle-to-vehicle distance between the vehicle and the peripheral vehicle; a travel speed measurement part that measures a travel speed of the vehicle; a travel direction detection part that detects a travel direction of the vehicle; and a dangerous act detection part that judges that a dangerous act occurs when a situation in which the vehicle-to-vehicle distance is shorter than a preset first threshold and the travel speed exceeds a preset second threshold occurs within a predetermined time; and transmits dangerous act detection information including information according to the peripheral vehicle specific information, the position, the travel speed and the travel direction to the management center apparatus. The management center apparatus is configured to: receive the dangerous act detection information; thereby select the warning output apparatus at a position where the vehicle and the peripheral vehicle pass, due to use of a preset warning output apparatus database, based on the position, the travel speed, and the travel direction of the dangerous act detection information; and transmit warning output instruction information to the selected warning output apparatus, the warning output instruction information being information for instructing to output a warning including the peripheral vehicle specific information. The warning output apparatus receives the warning output instruction information and thereby outputs a warning including the peripheral vehicle specific information.

According to a second aspect, a dangerous act resolution apparatus in a dangerous act resolution system is provided, wherein the dangerous act resolution system comprises: a warning output apparatus that outputs a warning; a management center apparatus that is communicably connected to the warning output apparatus and controls the warning output apparatus; and the dangerous act resolution apparatus that is communicably connected to the management center apparatus; is installed in a vehicle; and instructs the management center apparatus to resolve a dangerous act when a dangerous act of a peripheral vehicle traveling around the vehicle is detected. The dangerous act resolution apparatus comprises: an acquisition part that acquires peripheral vehicle specific information for specifying the peripheral vehicle; a position detection part that detects a position of the vehicle; a vehicle-to-vehicle distance measurement part that measures a vehicle-to-vehicle distance between the vehicle and the peripheral vehicle; a travel speed measurement part that measures a travel speed of the vehicle; a travel direction detection part that detects a travel direction of the vehicle; and a dangerous act detection part that judges that a dangerous act occurs when a situation in which the vehicle-to-vehicle distance is shorter than a preset first threshold and the travel speed exceeds a preset second threshold occurs within a predetermined time; and transmits dangerous act detection information including information according to the peripheral vehicle specific information, the position, the travel speed and the travel direction to the management center apparatus.

According to a third aspect, a method of resolving dangerous act is provided, wherein the method resolves dangerous act by using: a warning output apparatus that outputs a warning; a management center apparatus that is communicably connected to the warning output apparatus and controls the warning output apparatus; and a dangerous act resolution apparatus that is communicably connected to the management center apparatus; is installed in a vehicle; and instructs the management center apparatus to resolve a dangerous act when a dangerous act of a peripheral vehicle traveling around the vehicle is detected. The method comprises: acquiring peripheral vehicle specific information for specifying the peripheral vehicle, in the dangerous act resolution apparatus; detecting a position of the vehicle, in the dangerous act resolution apparatus; measuring a vehicle-to-vehicle distance between the vehicle and the peripheral vehicle, in the dangerous act resolution apparatus; measuring a travel speed of the vehicle, in the dangerous act resolution apparatus; detecting a travel direction of the vehicle, in the dangerous act resolution apparatus; judging that a dangerous act occurs when a situation in which the vehicle-to-vehicle distance is shorter than a preset first threshold and the travel speed exceeds a preset second threshold occurs within a predetermined time; and transmitting dangerous act detection information including information according to the peripheral vehicle specific information, the position, the travel speed and the travel direction to the management center apparatus, in the dangerous act resolution apparatus; receiving the dangerous act detection information; thereby selecting the warning output apparatus at a position where the vehicle and the peripheral vehicle pass, due to use of a preset warning output apparatus database, based on the position, the travel speed, and the travel direction of the dangerous act detection information; and transmitting warning output instruction information to the selected warning output apparatus, the warning output instruction information being information for instructing to output a warning including the peripheral vehicle specific information, in the management center apparatus, and receiving the warning output instruction information; and thereby outputting a warning including the peripheral vehicle specific information, in the warning output apparatus.

According to a fourth aspect, a program for causing a dangerous act resolution apparatus in a dangerous act resolution system to execute predetermined processing is provided, wherein the dangerous act resolution system comprising: a warning output apparatus that outputs a warning; a management center apparatus that is communicably connected to the warning output apparatus and controls the warning output apparatus; and the dangerous act resolution apparatus that is communicably connected to the management center apparatus; is installed in a vehicle; and instructs the management center apparatus to resolve a dangerous act when a dangerous act of a peripheral vehicle traveling around the vehicle is detected. The program causes the dangerous act resolution apparatus to execute: acquiring peripheral vehicle specific information for specifying the peripheral vehicle; detecting a position of the vehicle; measuring a vehicle-to-vehicle distance between the vehicle and the peripheral vehicle; measuring a travel speed of the vehicle; detecting a travel direction of the vehicle; and judging that a dangerous act occurs when a situation in which the vehicle-to-vehicle distance is shorter than a preset first threshold and the travel speed exceeds a preset second threshold occurs within a predetermined time; and transmitting dangerous act detection information including information according to the peripheral vehicle specific information, the position, the travel speed and the travel direction to the management center apparatus.

The program can be recorded on a computer-readable storage medium. The storage medium may be non-transient such as a semiconductor memory, a hard disk, a magnetic recording medium, an optical recording medium, or the like. Also, the present disclosure can also be embodied as a computer program product.

Effects of Invention

According to the first to fourth aspects, it is possible to contribute to solve a situation in which a dangerous act of a peripheral vehicle is received.

BRIEF DESCRIPTION OF THE DRAWINGS

FIG. 3 is a table schematically showing a threshold database used in a dangerous act resolution apparatus in the dangerous act resolution system according to the first exemplary embodiment.

PREFERRED MODES

Figure 1:
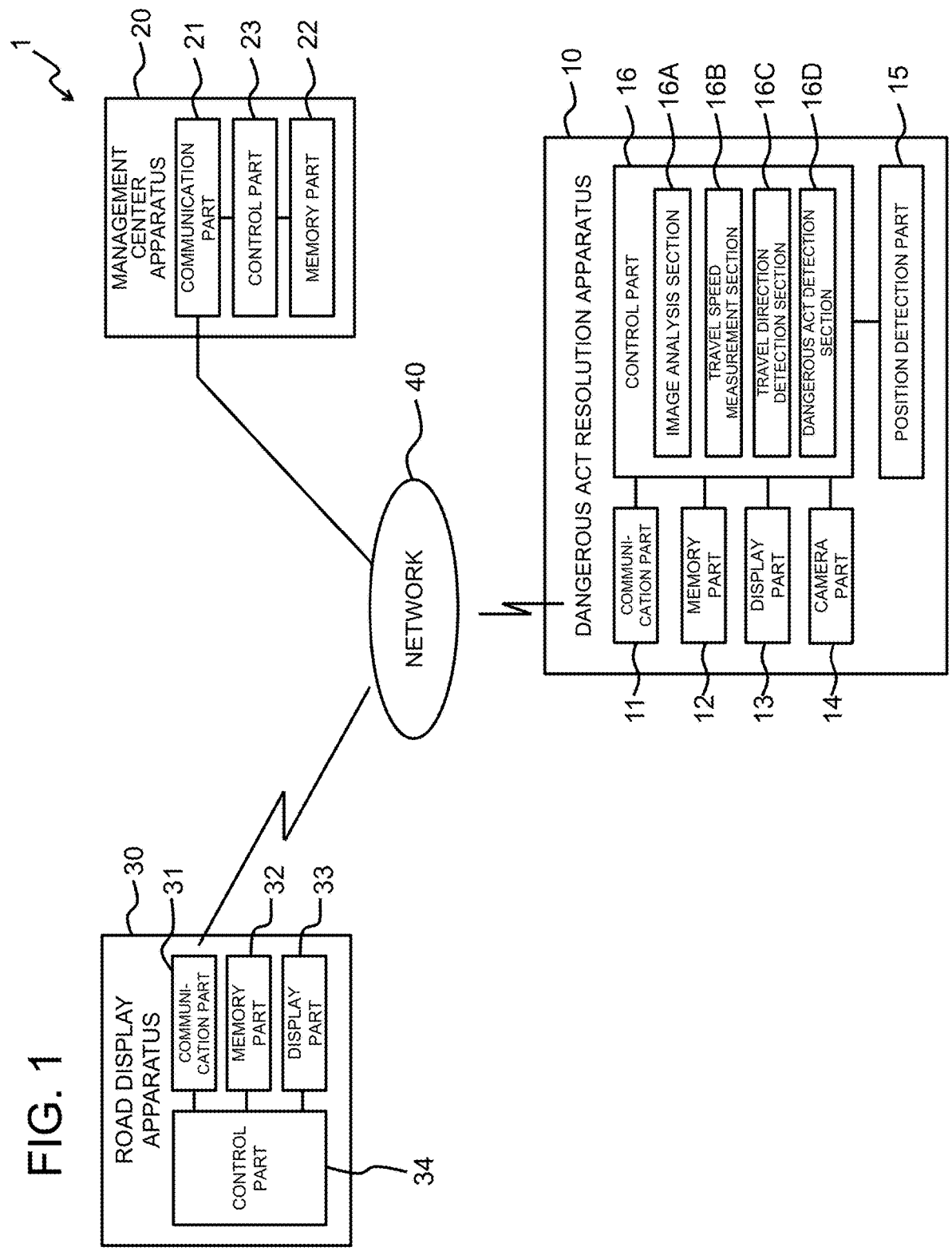
FIG. 1 is a block diagram schematically showing a configuration of a dangerous act resolution system according to a first exemplary embodiment.

Hereinafter, exemplary embodiments will be explained with reference to the drawings. It should be noted that, in the present application, when reference signs are given in the drawings, they are only for the purpose of facilitating understanding, and are not intended to limit to the illustrated modes of the drawings. Also, the following exemplary embodiments are merely examples, and do not limit the present invention. Further, connection lines between blocks in the drawings or the like referred to in the following explanation include both bidirectional and unidirectional. The one-way arrow schematically shows a flow of a main signal (data), and does not exclude bidirectionality.

The program can be recorded on a computer-readable storage medium. The storage medium may be non-transient such as a semiconductor memory, a hard disk, a magnetic recording medium, an optical recording medium, or the like. Also, the present disclosure can also be embodied as a computer program product.

First Exemplary Embodiment

Figure 2:
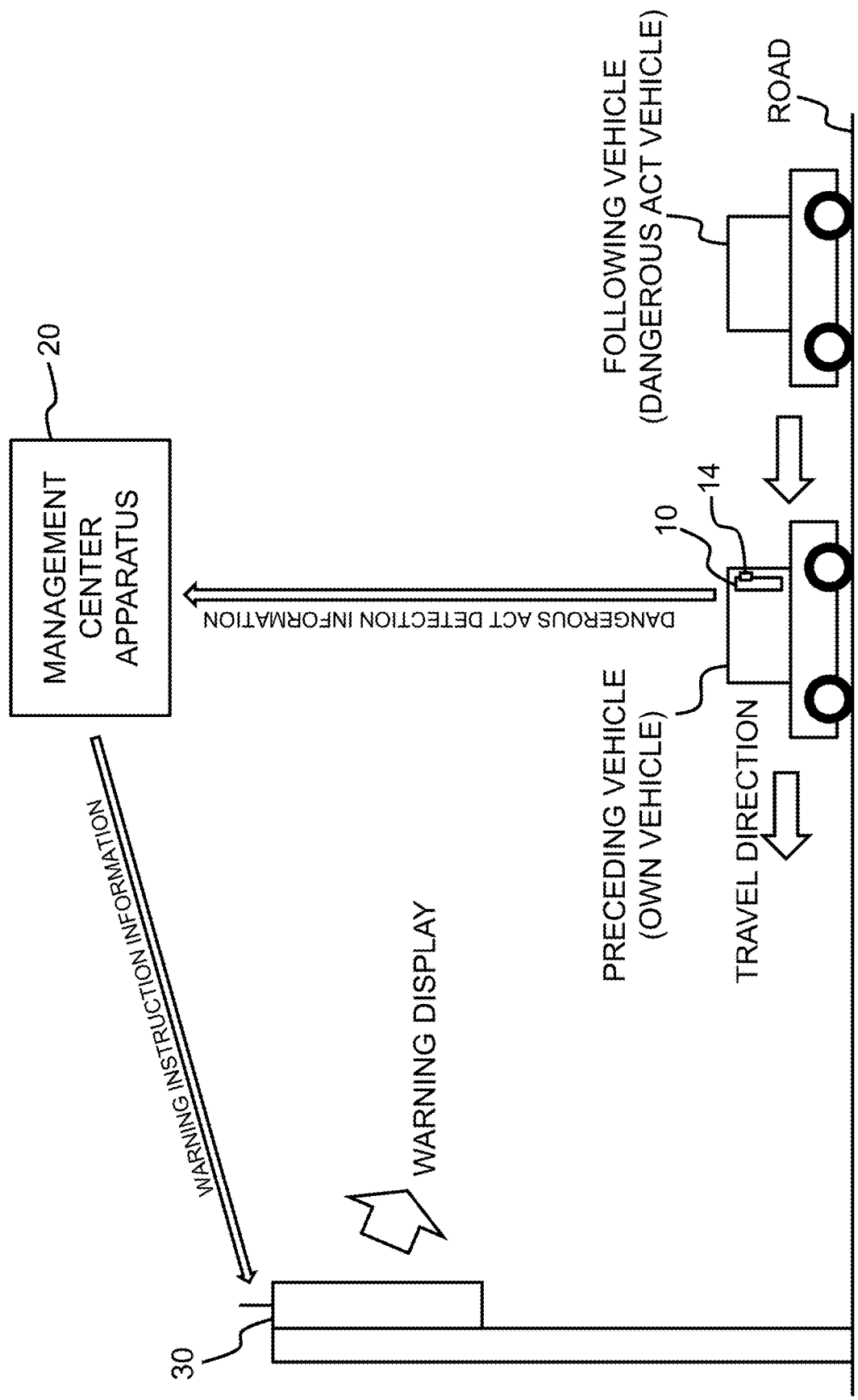
FIG. 2 is an image diagram schematically showing the configuration of the dangerous act resolution system according to the first exemplary embodiment.
Figure 4A:
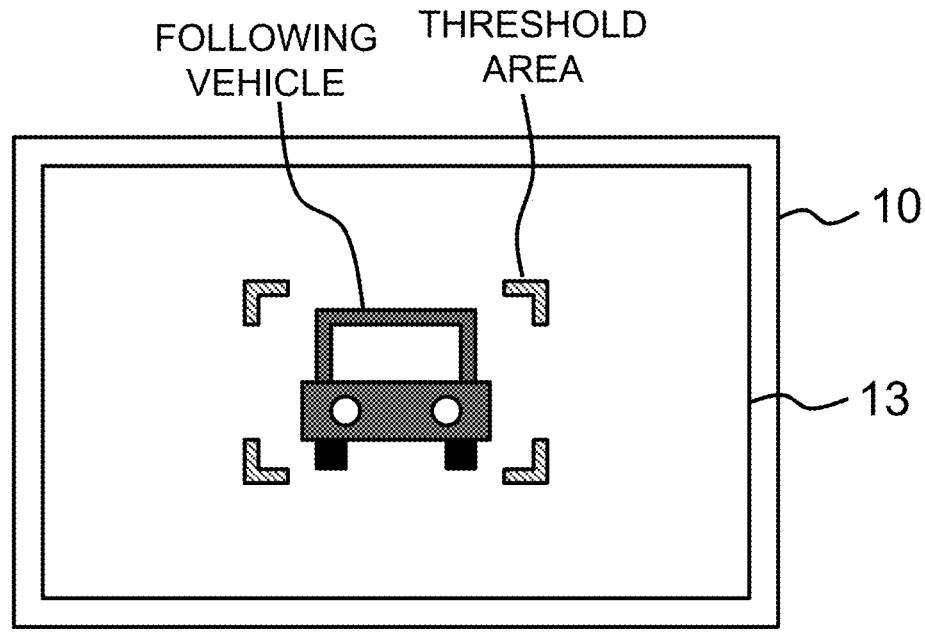
FIG. 4A is an image diagram when a vehicle size is greater than a threshold schematically showing a size and a threshold of a following vehicle displayed on the display part of the dangerous act resolution apparatus in the dangerous act resolution system according to the first exemplary embodiment.
Figure 4B:
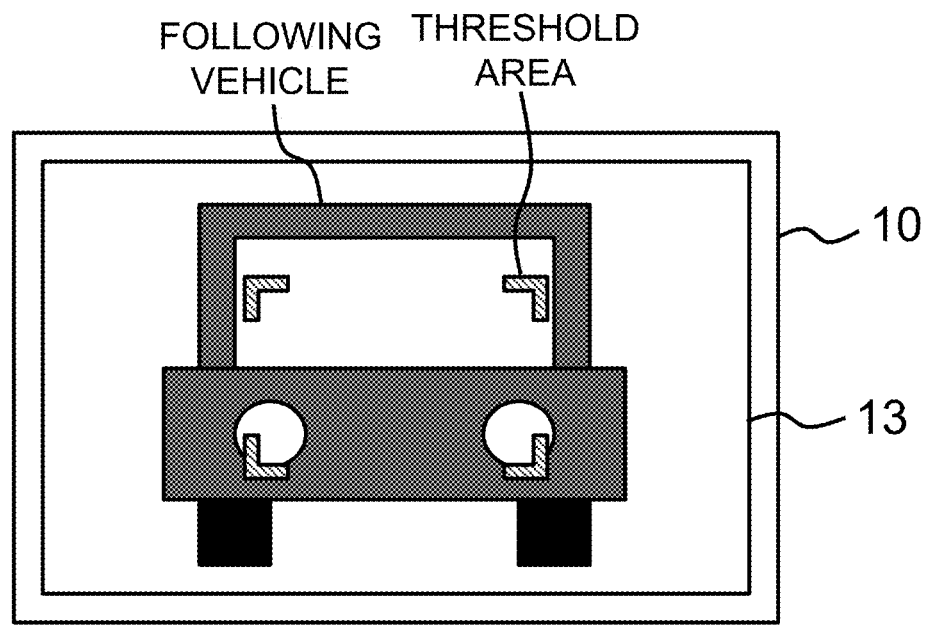
FIG. 4B is an image diagram when a vehicle size is less than a threshold schematically showing a size and threshold of a following vehicle displayed on the display part of the dangerous act resolution apparatus in the dangerous act resolution system according to the first exemplary embodiment.

A dangerous act resolution system according to a first exemplary embodiment will be described with reference to the drawings. FIG. 1 is a block diagram schematically showing a configuration of the dangerous act resolution system according to the first exemplary embodiment. FIG. 2 is an image diagram schematically showing the configuration of the dangerous act resolution system according to the first exemplary embodiment. FIG. 3 is a table schematically showing a threshold database used in a dangerous act resolution system in the dangerous act resolution system according to the first exemplary embodiment. FIG. 4A is an image diagram when a vehicle size is greater than a threshold schematically showing a size and a threshold of a following vehicle displayed on the display part of the dangerous act resolution apparatus in the dangerous act resolution system according to the first exemplary embodiment. FIG. 4B is an image diagram when a vehicle size is less than a threshold schematically showing a size and threshold of a following vehicle displayed on the display part of the dangerous act resolution apparatus in the dangerous act resolution system according to the first exemplary embodiment.

The dangerous act resolution system 1 is a system for resolving a dangerous act (for example, a tailgating of a following vehicle) (see FIG. 1). The dangerous act resolution system 1 comprises a dangerous act resolution apparatus 10; a management center apparatus 20; a road display apparatus 30; and a network 40.

The dangerous act resolution apparatus 10 is an apparatus having a function of instructing the management center apparatus 20 to resolve the dangerous act when the dangerous act is detected (see FIG. 1). As the dangerous act resolution apparatus 10, an apparatus having an information processing function and a communication function is used and for example, a mobile communication apparatus such as a smartphone, a tablet terminal or the like can be used. The dangerous act resolution apparatus 10 is set up in a vehicle before starting driving (running), and is set up at a position where a camera part 14 of the dangerous act resolution apparatus 10 can photograph a following vehicle. The dangerous act resolution apparatus 10 comprises a communication part 11; a memory part 12; a display part 13; a camera part 14; a position detection part 15; and a control part 16 as main function parts. The dangerous act resolution apparatus 10 may have function parts such as a speaker part, a microphone part, a touch panel, a battery, and a connector that are mounted on a general mobile communication apparatus.

The communication part 11 is a function part (for example, an interface or the like) for communicating (transmitting/receiving) information (see FIG. 1). The communication part 11 is communicably connected to the network 40 by wireless.

The memory part 12 is a function part that stores information such as various data, programs (including application software), files, and the like (see FIG. 1). As the memory part 12, for example, a storage device such as a ROM (Read Only Memory) or a RAM (Random Access Memory) can be used. The memory part 12 stores a threshold database 12a (see FIG. 3) which related and organized a threshold of vehicle sizes for every driving speed.

The threshold database 12a is used in a dangerous act detection section 16d, according to a travel speed measured by a travel speed measurement section 16b, in order to change a threshold of a vehicle size in image information analyzed by an image analysis section 16a.

The display part 13 is a function part for displaying information (see FIG. 1). As the display part 13, for example, a display device such as a liquid crystal display or an organic EL (Electro-Luminescence) can be used.

The camera part 14 is a function part (acquisition part) for taking (photographing, capturing, shooting) an image (see FIGS. 1 and 2). As the camera part 14, for example, an image sensor such as a CCD (Charge-Coupled Device) sensor or a CMOS (Complementary Metal-Oxide Semiconductor) sensor can be used.

The position detection part 15 is a function part for detecting (positioning) position information (see FIG. 1). As the position detection part 15, for example, a GPS (Global Positioning System) receiver or the like can be used. The position detection part 15 provides the detected position information to the travel speed measurement section 16*b* and the travel direction detection section 16*c*.

The control part 16 is a function part that controls the communication part 11, the memory part 12, the display part 13, the camera part 14, and the position detection part 15 (see FIG. 1). The control part 16 has a time function. The control part 16 controls the communication part 11 to transmit/receive information to/from the management center apparatus 20. The control part 16 writes/reads data to/from the memory part 12. The control part 16 controls the display part 13 to display information on the display part 13. The control part 16 performs predetermined information processing by executing a program. The control part 16 realizes an image analysis section 16*a*; a travel speed measurement section 16*b*; a travel direction detection section 16*c*, and a dangerous act detection section 16*d* by executing a program.

The image analysis section 16*a* is a processing section (acquisition part, vehicle-to-vehicle distance measurement section) that analyzes image information taken by the camera part 14. The image analysis section 16*a* has a function for starting and ending photographing by an instruction from the dangerous act detection section 16*d*. The image analysis section 16*a* has a function for recognizing whether there is a vehicle in an image displayed on a screen and a function for recognizing a vehicle size displayed on the screen. The image analysis section 16*a* measures a vehicle-to-vehicle distance (may be termed as "vehicle distance") between a preceding vehicle and a following vehicle according to a relative relationship between the vehicle size displayed on the screen and a preset threshold. The image analysis section 16*a* has a function for notifying the dangerous act detection section 16*d* as such when the vehicle size displayed on the screen exceeds the preset threshold. The image analysis section 16*a* may have a function for image-recognizing a vehicle number of a following vehicle, based on image information taken by the camera part 14.

The travel speed measurement section 16*b* is a processing section that measures a travel speed of the own vehicle (moving speed of the dangerous act resolution apparatus 10) based on a time change of a position information detected by the position detection part 15. The travel speed measurement section 16*b* has a function for notifying the dangerous act detecting section 16*d* as such when the measured travel speed exceeds a preset threshold.

The travel direction detection section 16*c* is a processing section that detects a travel direction information of the own vehicle (moving direction of the dangerous act resolution apparatus 10) based on a change in the position information detected by the position detection part 15.

The dangerous act detection section 16*d* is a processing section that detects whether a dangerous act occurs (receives a dangerous act) (see FIG. 1). The dangerous act detection section 16*d* changes a threshold for the vehicle size in the image information analyzed by the image analysis section 16*a*, according to the travel speed measured by the travel speed measurement section 16*b*, based on the threshold database 12*a* (see FIG. 3). As a result, an accuracy of judgement as to whether or not a dangerous act occurs can be improved. The dangerous act detection section 16*d* sets a threshold for the travel speed in the travel speed measurement section 16*b*, and sets a threshold for the vehicle size displayed on the screen in the image analysis section 16*a*. The dangerous act detection section 16*d* acquires necessary information from the image analysis section 16*a* and the travel speed measurement section 16*b* at an arbitrary timing. The dangerous act detection section 16*d* causes the image analysis section 16*a* to start analysis of image information when the travel speed measured by the travel speed measurement section 16*b* exceeds the threshold. The dangerous act detection section 16*d* confirms whether or not a situation in which both the moving speed and the vehicle size exceed the thresholds occurs for a certain time, when the vehicle size displayed in the image information exceeds a preset threshold (see FIGS. 4*a* and 4*b*), by analyzing the image information in the image analysis section 16*a*. A confirmation concerning whether or not the situation in which both the moving speed and the vehicle size exceed the thresholds occurs for a certain time can be performed by using an alarm counter value and a timer value. The dangerous act detection section 16*d* judges that a dangerous act occurs, when a situation in which both the moving speed and the vehicle size exceed the thresholds occurs for a certain time. The dangerous act detection section 16*d* generates dangerous act detection information including: the image information taken by the camera part 14 (peripheral vehicle specific information; image information of the following vehicle, the vehicle number of the following vehicle image-recognized by the image analysis section 16*a*); the position information detected by the position detection part 15; the travel speed information measured by the travel speed measurement section 16*b*; and the travel direction information detected by the travel direction detection section 16*c*, when judging that a dangerous act occurs. The dangerous act detection section 16*d* transmits the generated dangerous act detection information (including the taken image information, the position information, the travel speed information, and the travel direction information) to the management center apparatus 20 through the communication part 11.

The management center apparatus 20 is an apparatus that controls (manages) the road display apparatus 30 (see FIG. 1). The management center apparatus 20 instructs to output a warning to the road display apparatus 30 that may exist in a travel direction ahead of the own vehicle on which the dangerous act resolution apparatus 10 is mounted, based on the dangerous act detection information from the dangerous act resolution apparatus 10. The management center apparatus 20 comprises: a communication part 21; a memory part 22; and a control part 23, as main function parts.

The communication part 21 is a function part (for example, an interface or the like) for communicating (transmitting/receiving) information (see FIG. 1). The communication part 21 is communicably connected to the network 40.

The memory part 22 is a function part that stores information such as various data, programs, or files (see FIG. 1). As the memory part 22, for example, a storage device such as a hard disk or a RAID (Redundant Arrays of Independent Disks) device can be used. The memory part 22 stores a warning output apparatus database organized in association with position information and an address for each warning output apparatus. The memory part 22 stores the dangerous act detection information from the dangerous act resolution apparatus 10.

The control part 23 is a function part that controls the communication part 21 and the memory part 22 (see FIG. 1). The control part 23 has a time function. The control part 23 controls the communication part 21 to transmit/receive information to/from the dangerous act resolution apparatus 10 and the road display apparatus 30. The control part 23 writes/reads data to/from the memory part 22. The control part 23 performs predetermined information processing by executing a program.

The control part 23 receives the dangerous act detection information (including the taken image, the position information, the travel speed information, and the travel direction information) from the dangerous act resolution apparatus 10, through the communication part 21; and thereby causes the memory part 22 to store the received dangerous act detection information. The control part 23 extracts one or more addresses related to the road display apparatus 30 from the warning output apparatus database, based on the position information, the travel speed information, and the travel direction information of the stored dangerous act detection information, the road display apparatus 30 being associated with the position information corresponding to a position that the preceding vehicle (own vehicle mounted on the dangerous act resolution apparatus 10) and the following vehicle (warning subject vehicle) may pass through thereafter. The control part 23 transmits warning output instruction information for instructing output of a warning for a certain time to the road display apparatus 30 associated with the extracted address through the communication part 21.

The road display apparatus 30 is a display apparatus (warning output apparatus) that is installed on a road and displays a warning (see FIGS. 1 and 2). As the road display apparatus 30, for example, an existing road information display board installed on a road such as a highway or a main road can be used. The road display apparatus 30 may be a character display board mounted on a highway management vehicle. The road display apparatus 30 comprises: a communication part 31; a memory part 32; a display part 33; and a control part 34, as main function parts.

The communication part 31 is a function part (for example, an interface or the like) for communicating (transmitting/receiving) information (see FIG. 1). The communication part 31 is communicably connected to the network 40 by wireless (wire available).

The memory part 32 is a function part that stores information such as various data, programs, or files (see FIG. 1). As the memory part 32, for example, a storage device such as a ROM (Read Only Memory) or a RAM (Random Access Memory) can be used.

The display part 33 is a function part for displaying information (see FIG. 1). As the display part 33, for example, a display part that displays arbitrary characters, numbers, images, or the like by using an LED (Light Emitting Diode) or a light bulb can be used.

The control part 34 is a function part that controls the communication part 31, the memory part 32, and the display part 33 (see FIG. 1). The control part 34 controls the communication part 31 to transmit/receive information to/from the management center apparatus 20. The control part 34 writes/reads data to/from the memory part 32. The control part 34 controls the display part 33 to display information on the display part 33. The control part 34 performs predetermined information processing by executing a program.

The control part 34 receives the warning output instruction information from the management center apparatus 20, through the communication part 31; and thereby causes the display part 33 to display a warning for a certain time so as to urge the following vehicle to quit a dangerous act. In the warning display, warning messages (for example, stop dangerous driving, keep vehicle-to-vehicle distance enough) to the following vehicles (dangerous act vehicle), and information specifying a dangerous act vehicle (camera taking image, registration number, or the like) can be displayed.

The network 40 is an information communication network that connects the dangerous act resolution apparatus 10, the management center apparatus 20, and the road display apparatus 30 to enable communicate by wire or wireless (see FIG. 1). As the network 40, for example, a communication network such as fourth generation mobile communication can be used.

Figure 5:
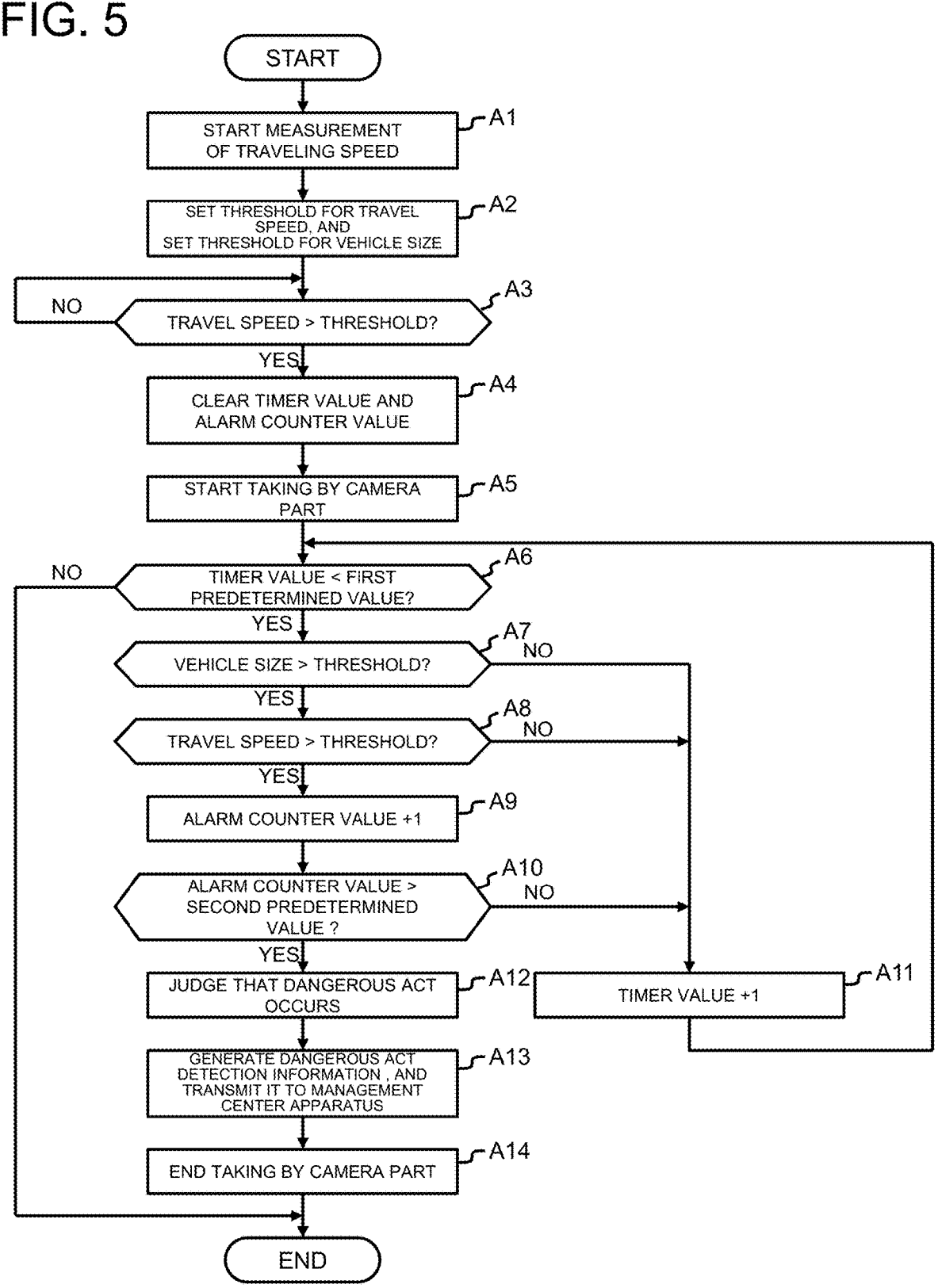
FIG. 5 is a flowchart schematically showing operations of a dangerous act detection section of a control part of the dangerous act resolution apparatus in the dangerous act resolution system according to the first exemplary embodiment.

Next, operations of the dangerous act detection section of the control part of the dangerous act resolution apparatus in the dangerous act resolution system according to the first exemplary embodiment will be described with reference to the drawings. FIG. 5 is a flowchart schematically showing operations of the dangerous act detection section of the control part of the dangerous act resolution apparatus in the dangerous act resolution system according to the first exemplary embodiment. Refer to FIGS. 1 to 3 as to each of the component parts of the dangerous act resolution system 1.

Before starting operations of the control part 16 of the dangerous act resolution apparatus 10, the dangerous act resolution apparatus 10 is installed in the own vehicle. When a driver of the own vehicle starts driving, operations of the control part 16 is started (operations of the dangerous act detection function is started). The operation can be started by starting an application software of the dangerous act detection function. The dangerous act resolution apparatus 10 is fixed in the car so that it does not move from the installation location during driving, and if necessary, or is connected to an external battery or vehicle battery by a USB (Universal Serial Bus) cable or the like, thereby the battery of the dangerous act resolution apparatus 10 is prevented from running out.

When operations of the dangerous act detection function is started, first, the dangerous act detection section 16*d* of the control part 16 of the dangerous act resolution apparatus 10 starts measurement of a travel speed of the own vehicle by the travel speed measurement section 16*b* (Step A1).

Next, the dangerous act detection section 16*d* sets a threshold for the travel speed to the travel speed measurement section 16*b*, and sets a threshold for the vehicle size displayed on the screen for the image analysis section 16*a* (Step A2).

Here, in the setting of the threshold for the travel speed, it is set to notify the dangerous act detecting section 16*d* from the travel speed measurement section 16*b* as such, when the threshold is exceeded. For example, it is possible to perform so that the threshold for the travel speed is set to 50 km/h, and it is set to notify the dangerous act detecting section 16*d* from the travel speed measurement section 16*b* as such, when it exceeds 50 km/h. Also, in the setting of the threshold for the vehicle size, it is set to notify the dangerous act detection section 16*d* from the image analysis section 16*a* notifies as such, when the threshold is exceeded.

Next, the dangerous act detection section 16*d* judges whether or not the measured travel speed exceeds the set threshold (for example, 50 km/h) by using the position detection part 15 and the travel speed measurement section

16*b*. (Step A3). When the travel speed does not exceed the threshold (NO of step A3), the process returns to Step A3.

When the travel speed exceeds the threshold (YES of Step A3), the dangerous act detection section 16*d* clears the timer value and the alarm counter value counted in the dangerous act detection section 16*d* to 0 (Step A4).

Here, the timer value is a certain time set for judging whether a dangerous act occurs. Also, the alarm counter value is a value for confirming whether or not a state in which there is a possibility that a dangerous act is received within a predetermined certain time (as the state, for example, a state where the speed exceeds 50 km/h and the following vehicle is abnormally approaching the own vehicle).

Next, the dangerous act detection section 16*d* starts taking by the camera part 14 (Step A5).

After step A5 or step A11, the dangerous act detection section 16*d* judges whether or not the timer value is less than a preset first predetermined value (for example, 15 seconds) (Step A6). When the timer value is not less than the first predetermined value (the timer value is the first predetermined value or more) (NO of Step A6), the process ends.

When the timer value is less than the first predetermined value (YES of Step A6), the dangerous act detection section 16*d* recognizes a vehicle size of the following vehicle displayed on the screen by using the camera part 14 and the image analysis section 16*a*, and judges whether or not the recognized vehicle size exceeds the threshold set in Step A2 (Step A7). When the vehicle size does not exceed the threshold (NO of Step A7), the process proceeds to Step A11.

When the vehicle size exceeds the threshold (YES of Step A7), the dangerous act detection section 16*d* judges whether or not the measured travel speed exceeds the set threshold (for example, 50 km/h) by using the position detection part 15 and the travel speed measurement section 16*b* (Step A8). When the travel speed does not exceed the threshold (NO of Step A8), the process proceeds to Step A11.

When the travel speed exceeds the threshold (YES of Step A8), the dangerous act detection section 16*d* recognizes that there is a possibility of a dangerous act (tailgating) and adds 1 to the alarm counter value (Step A9).

Next, the dangerous act detection section 16*d* judges whether or not the alarm counter value after the addition of Step A9 exceeds a preset second predetermined value (for example, 5 times) (Step A10). When the alarm counter value exceeds the second predetermined value (YES of Step A10), the process proceeds to Step A12. When the alarm counter value does not exceed the second predetermined value (the alarm counter value is the second predetermined value or less) (NO of Step A10), the process proceeds to Step A11.

Here, when the alarm counter value is less than the second predetermined value, since there is a possibility that the following vehicle only temporarily gets closer, it is not judged that a dangerous act occurs.

When the vehicle size does not exceed the threshold (NO of Step A7); when the travel speed does not exceed the threshold (NO of Step A8); or when the alarm counter value does not exceed the second predetermined value (NO of Step A10), the dangerous act detection section 16*d* adds 1 to the timer value (Step A11), and then returns to Step A6.

When the alarm counter value exceeds the second predetermined value (YES of Step A10), the dangerous act detection section 16*d* judges that a dangerous act occurs (Step A12).

Next, the dangerous act detection section 16*d* generates dangerous act detection information including the image information taken by the camera part 14 (as the image information, it may use the vehicle number of the following vehicle recognized by the image analysis section 16*a*), the position information detected by the position detection part 15, the travel speed measured by the travel speed measurement section 16*b* and the travel direction information detected by the travel direction detection section 16*c*; and transmits the generated dangerous act detection information to the management center apparatus 20 through the communication part 11 and the network 40 (Step A13).

Finally, the dangerous act detection section 16*d* ends the taking by the camera part 14 (Step A14), and then ends.

Figure 6:
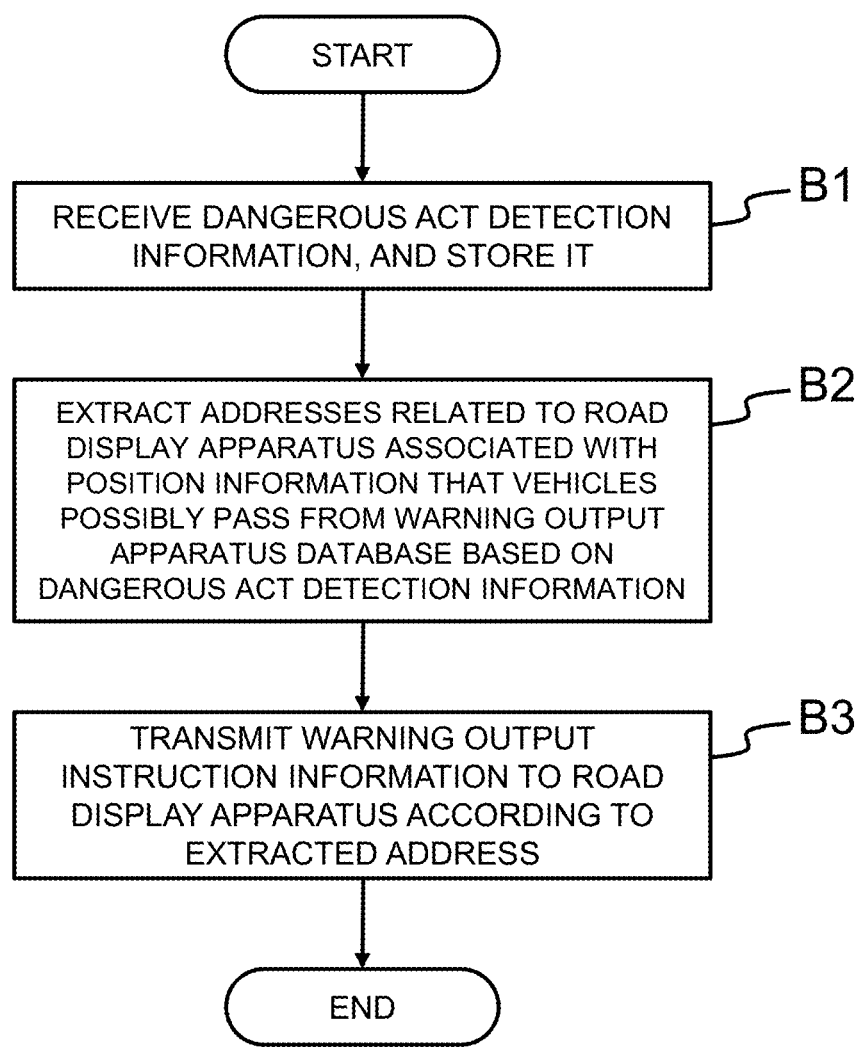
FIG. 6 is a flowchart schematically showing operations of a control part of a management center apparatus in the dangerous act resolution system according to the first exemplary embodiment.

Next, operations of the control part of the management center apparatus in the dangerous act resolution system according to the first exemplary embodiment will be described with reference to the drawings. FIG. 6 is a flowchart schematically showing the operations of the control part of the management center apparatus in the dangerous act resolution system according to the first exemplary embodiment. Refer to FIGS. 1 to 3 as to each of the component parts of the dangerous act resolution system 1.

First, the control part 23 of the management center apparatus 20 receives dangerous act detection information (including the taken image, the position information, the travel speed information, and the travel direction information) from the dangerous act resolution apparatus 10 through the network 40 and the communication part 21; and stores the received dangerous act detection information into the memory part 22 (Step B1).

Next, the control part 23 extracts one or more addresses related to the road display apparatus 30 associated with the position information corresponding to a position in which there is a possibility that the preceding vehicle (own vehicle mounted on dangerous act resolution apparatus 10) and the following vehicle (warning subject vehicle) then pass, from the warning output apparatus database of the memory part 22, based on the stored position information, the travel speed information, and the travel direction information in the dangerous act detection information (Step B2).

Finally, the control part 23 transmits warning output instruction information for instructing output of a warning for a certain time to the road display apparatus 30 according to the extracted address through the communication part 21 and the network 40 (Step B3), and then the process ends.

Next, operations of the control part of the road display apparatus in the dangerous act resolution system according to the first exemplary embodiment will be described.

The control part 34 of the road display apparatus 30 receives the warning output instruction information from the management center apparatus 20 through the network 40 and the communication part 31; and thereby causes the display part 33 to display a warning for urging the following vehicle to quit a dangerous act for a certain time (Step C1), and the process ends after elapsing for a certain time. Then the process returns to the start.

According to the first exemplary embodiment, since it is possible to warn to a vehicle performing a dangerous act (such as tailgating) by using the road display apparatus 30 with high visibility (higher visibility than a recorder, camera, or sticker installed in the own vehicle), it becomes easy that the driver of the following vehicle is aware of an own dangerous act, and it can contribute to resolve a situation in which the dangerous act of the following vehicle is received.

Also, according to the first exemplary embodiment, since it is possible to confirm a situation in which a dangerous act is received by the dangerous act resolution apparatus 10 using a portable communication apparatus (smart phone or the like) that is portable and socially popular; and it is possible to warn (or be careful) by using the existing road display apparatus 30 (road information display board or the like), it is unnecessary to fix and mount a special apparatus for detecting a dangerous act in a vehicle, and dedicated facilities for warning are unnecessary.

In the exemplary embodiment 1, since there is only the dangerous act resolution apparatus 10, a management center apparatus 20, and the road display apparatus 30, it can also be used for things other than vehicles. For example, in a field of people entrance/exit management and crime prevention measures, it is possible to use as follows by installing a communication apparatus in an arbitrary place without providing dedicated facilities such as a monitoring camera. A thing for confirming/analyzing on a screen is set to an unspecified person or a specified person, not a vehicle; the dangerous act resolution apparatus 10 is installed at a place where you want to confirm the entry/exit of those person; and operation start condition is set to reflect those persons instead of a speed. It can also be used as follows: when the dangerous act resolution apparatus 10 recognizes these persons, the management center apparatus 20 is notified; voice guidance or the like is output from the dangerous act resolution apparatus 10 to notify peripheral people; and a taken video is transferred to the management center apparatus 20 and saved there.

Second Exemplary Embodiment

A dangerous act resolution system according to a second exemplary embodiment will be described. Refer to FIGS. 1 and 2 as to each component part of the dangerous act resolution system.

The second exemplary embodiment is a modification of the first exemplary embodiment, and is configured to judge that a dangerous act occurs when it is detected that the high beam state of the headlight of the following vehicle continues for a certain time.

Specifically, the dangerous act detection section 16d of the control part 16 of the dangerous act resolution apparatus 10 causes the image analysis section 16a (light intensity analysis section) to measure a vehicle-to-vehicle distance between the preceding vehicle and the following vehicle, in accordance with a relative relationship between a light intensity (such as a candela value) entering the camera part 14 (light intensity detection part; an optical sensor or an illuminance sensor mounted on the dangerous act resolution apparatus 10 is also available) and a preset threshold relating to a light intensity. When the dangerous act detection section 16d detects that the light intensity exceeds a threshold related to the light intensity and that the time in such a state exceeds the threshold related to the time, it is judged that a dangerous act (nuisance or harassment that could lead to an accident risk) occurs; and dangerous act detection information (including taken image, position information, travel speed information, and travel direction information) is generated. The dangerous act detection section 16d transmits the generated dangerous act detection information to the management center apparatus 20. Thereafter, similarly to the first exemplary embodiment, the management center apparatus 20 receives the dangerous act detection information; and transmits the dangerous act detection information to the road display apparatus 30 at a position in which there is a possibility that the preceding vehicle (own vehicle on which the dangerous act resolution apparatus 10 is mounted) and the following vehicle (warning subject vehicle) subsequently then pass. And the road display apparatus 30 receives the dangerous act detection information; and displays a warning for urging the following vehicle to quit a dangerous act for a certain time. Other configurations and operations are the same as those in the first exemplary embodiment. The second exemplary embodiment may be combined with the first exemplary embodiment.

According to the second exemplary embodiment, similarly to the first exemplary embodiment, since it is possible to warn (or be careful) to a vehicle performing a dangerous act (high beam driving or the like) by using the road display apparatus 30 with high visibility, it becomes easy that the driver of the following vehicle is aware of an own dangerous act, and it can contribute to resolve a situation in which the dangerous act of the following vehicle is received.

Third Exemplary Embodiment

Figure 7:
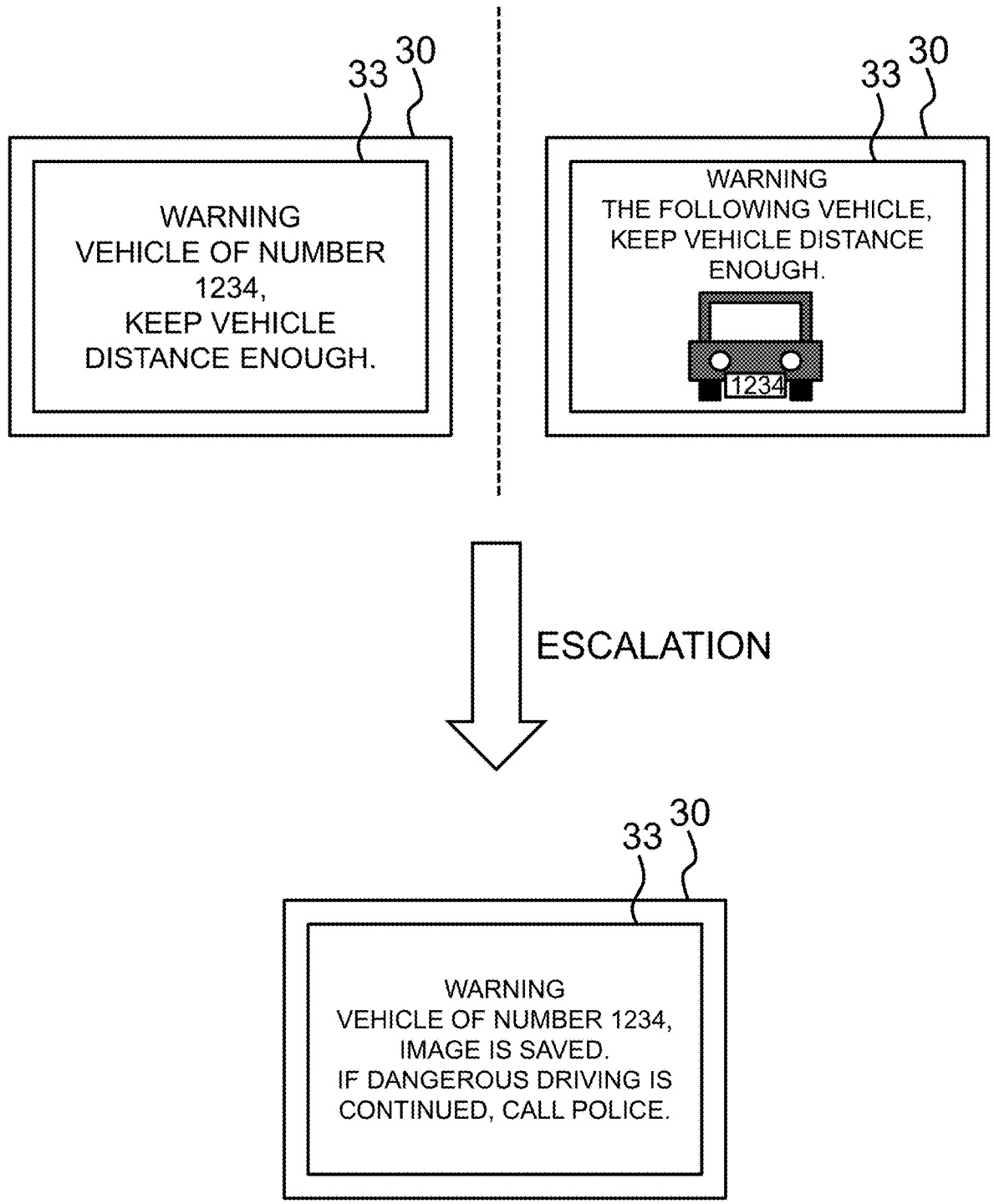
FIG. 7 is an image diagram schematically showing an escalation operation of a road display apparatus in a dangerous act resolution system according to a third exemplary embodiment.

A dangerous act resolution system according to a third exemplary embodiment will be described with reference to the drawings. FIG. 7 is an image diagram schematically showing an escalation operation of a road display apparatus in the dangerous act resolution system according to the third exemplary embodiment. Refer to FIGS. 1 and 2 as to each component part of the dangerous act resolution system.

The third exemplary embodiment is a modification of the first exemplary embodiment, and is configured to escalate (amplify, increase, and intensify step by step) warning contents displayed (output) on the road display apparatus 30.

In the first warning, the road display apparatus 30 controls the management center apparatus 20, and thereby displays a warning including a warning message "Keep vehicle-to-vehicle distance enough" to information that specifies the following vehicle by vehicle number as showing in upper left of FIG. 7, or by image as showing in upper right of FIG. 7, similarly to the first exemplary embodiment. When the dangerous act is still continued (when the management center apparatus 20 receives the same dangerous act detection information a plurality of times), the road display apparatus 30 controls the management center apparatus 20 and thereby escalates and displays the warning content as "Vehicle of No. 1234, image of your vehicle is saved. If you continue to drive dangerously, police will be notified." as showing in lower of FIG. 7. Other configurations and operations are the same as those in the first exemplary embodiment. The third exemplary embodiment may be applied to the first exemplary embodiment.

According to the third exemplary embodiment, similarly to the first exemplary embodiment, since it is possible to warn (or be careful) a vehicle performing a dangerous act by using the road display apparatus 30 with high visibility, it becomes easy that the driver of the following vehicle is aware of an own dangerous act, and it can contribute to resolve a situation in which the dangerous act of the following vehicle is received. Also, it becomes easy that the driver of the following vehicle is aware that an own is warned, a higher effect than in the first exemplary embodiment can be expected.

Fourth Exemplary Embodiment

A dangerous act resolution system according to a fourth exemplary embodiment will be described. Refer to FIGS. 1 and 2 as to each component part of the dangerous act resolution system.

The fourth exemplary embodiment is a modification of the first exemplary embodiment, and is configured to: install the dangerous act resolution apparatus 10 in the own vehicle so that the display part 13 of the dangerous act resolution apparatus 10 can be seen from the following vehicle, and the camera part 14 can take the following vehicle; and display the warning content on the display section 13 when the dangerous act detection section 16*d* of the control section 16 in the dangerous act resolution apparatus 10 detects the dangerous act of the following vehicle. Other configurations and operations are the same as those in the first exemplary embodiment. The fourth exemplary embodiment may be applied to the first or third exemplary embodiments.

According to the fourth exemplary embodiment, similarly to the first exemplary embodiment, since it is possible to warn (or be careful) to a vehicle performing a dangerous act by using the road display apparatus 30 with high visibility, it becomes easy that the driver of the following vehicle is aware of an own dangerous act, and it can contribute to resolve a situation in which the dangerous act of the following vehicle is received. Also, since it becomes easy that the driver of the following vehicle is aware that own is warned by displaying the warning content on the display part 13 of the dangerous act resolution apparatus 10 arranged so as to be visible from the following vehicle, a higher effect than in the first exemplary embodiment can be expected.

Fifth Exemplary Embodiment

Figure 8:
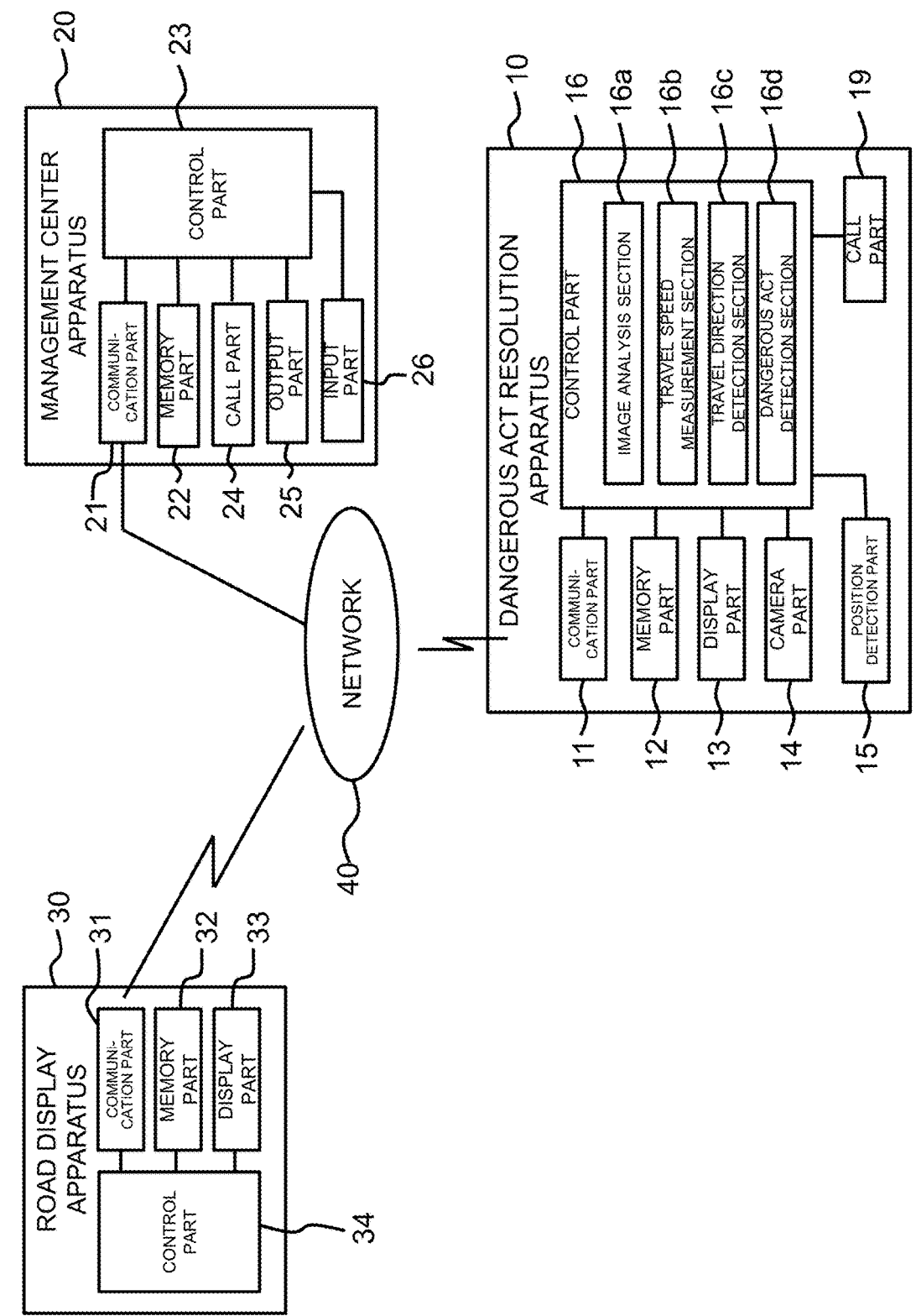
FIG. 8 is a block diagram schematically showing a configuration of a dangerous act resolution system according to a fifth exemplary embodiment.

A dangerous act resolution system according to a fifth exemplary embodiment will be described with reference to the drawings. FIG. 8 is a block diagram schematically showing a configuration of the dangerous act resolution system according to the fifth exemplary embodiment.

The fifth exemplary embodiment is a modification of the first exemplary embodiment; and is configured so that the dangerous act detection section 16*d* of the control part 16 of the dangerous act resolution apparatus 10 judges as "a situation that a dangerous act continuously occurs" when a dangerous act continuously occurs within a certain time; and transmits dangerous act continuation information including own vehicle information (information registered in advance in the dangerous act resolution apparatus 10) in addition to image information (image information of the following vehicle; vehicle number of the following vehicle image-recognized by the image analysis section 16*a* is available), position information, travel speed information, and travel direction information, separately from the dangerous act detection information, to the management center apparatus 20.

As an example of judging whether or not "a situation that a dangerous act continuously occurs", in the flowchart of FIG. 5, when the threshold of the timer value in Step A6 remains less than the first predetermined value (for example, less than 15 seconds); and the dangerous act continuously occurs for 14 seconds by setting the threshold of the alarm counter value in Step A10 to the second predetermined value exceeding (for example, 13 times exceeding), the dangerous act resolution apparatus 10 judges "a situation that the dangerous act continuously occurs"; and transmits the dangerous act continuation information to the management center apparatus 20.

The management center apparatus 20 that has received the dangerous act continuation information outputs the status of the dangerous act continuation information from the output part 25 (speaker, display part, lamp or the like that outputs information) of the management center apparatus 20 to convey to an operator of the management center apparatus 20 (see FIG. 8). The operator that has recognized the situation operates the input part 26 of the management center apparatus 20 to connect the management center apparatus 20 to the dangerous act resolution apparatus 10 that has transmitted the dangerous act continuation information so as to be able to call (telephone); and starts a call with the driver of the dangerous act resolution apparatus 10 side by using the call part 24 of the management center apparatus 20. The driver on the dangerous act resolution apparatus 10 side uses the speakerphone function (hands-free call function) of the call part 19 of the dangerous act resolution apparatus 10 to call (telephone) with the operator of the management center apparatus 20 side. The operator can urge the driver not to go out of the vehicle due to locking the door by the call. The operator of the management center apparatus 20 side deputizes a call to a third party such as the police on behalf of the driver as necessary in a call with the driver on the dangerous act resolution apparatus 10 side. When deputizing the call, referring to the dangerous act continuation information obtained from the dangerous act resolution apparatus 10, image information (vehicle number of the following vehicle is available), position information, travel speed information, travel direction information, and own vehicle information are conveyed to a third party.

When a dangerous act occurs intermittently within a certain time, the dangerous act detection section 16*d* of the control part 16 of the dangerous act resolution apparatus 10 judges "a situation that a dangerous act occurs" and performs the operation of the first exemplary embodiment.

Also, the operator may stay at a place different from the management center apparatus 20 when the operator has an information communication terminal (not shown) that can communicate with the management center apparatus 20. For example, the management center apparatus 20 is managed by a management company that manages the road display apparatus 30 such as an highway manager, and the operator may stay at a driver support center, a service provider company, an automobile insurance company or the like which is different from the management company to support the driver.

Other configurations and operations are the same as those in the first exemplary embodiment. The fifth exemplary embodiment may be applied to the first to fourth exemplary embodiments.

According to the fifth exemplary embodiment, similarly to the first exemplary embodiment, since it is possible to warn (or be careful) to a vehicle performing a dangerous act by using the road display apparatus 30 with high visibility, it becomes easy that the driver of the following vehicle is aware of an own dangerous act, and it can contribute to resolve a situation in which the dangerous act of the following vehicle is received.

Also, according to the fifth exemplary embodiment, in a situation in which it is difficult that the driver performs a normal judgment due to receiving mental distress (psychological pressure) by a dangerous act such as tailgating, it is possible to contribute to prevent the occurrence of an accident that the driver gets out of the vehicle according to the threat from the dangerous acter (dangerous driver, perpetrator) and runs over by the following vehicle, and the police can be notified smoothly.

Sixth Exemplary Embodiment

Figure 9:
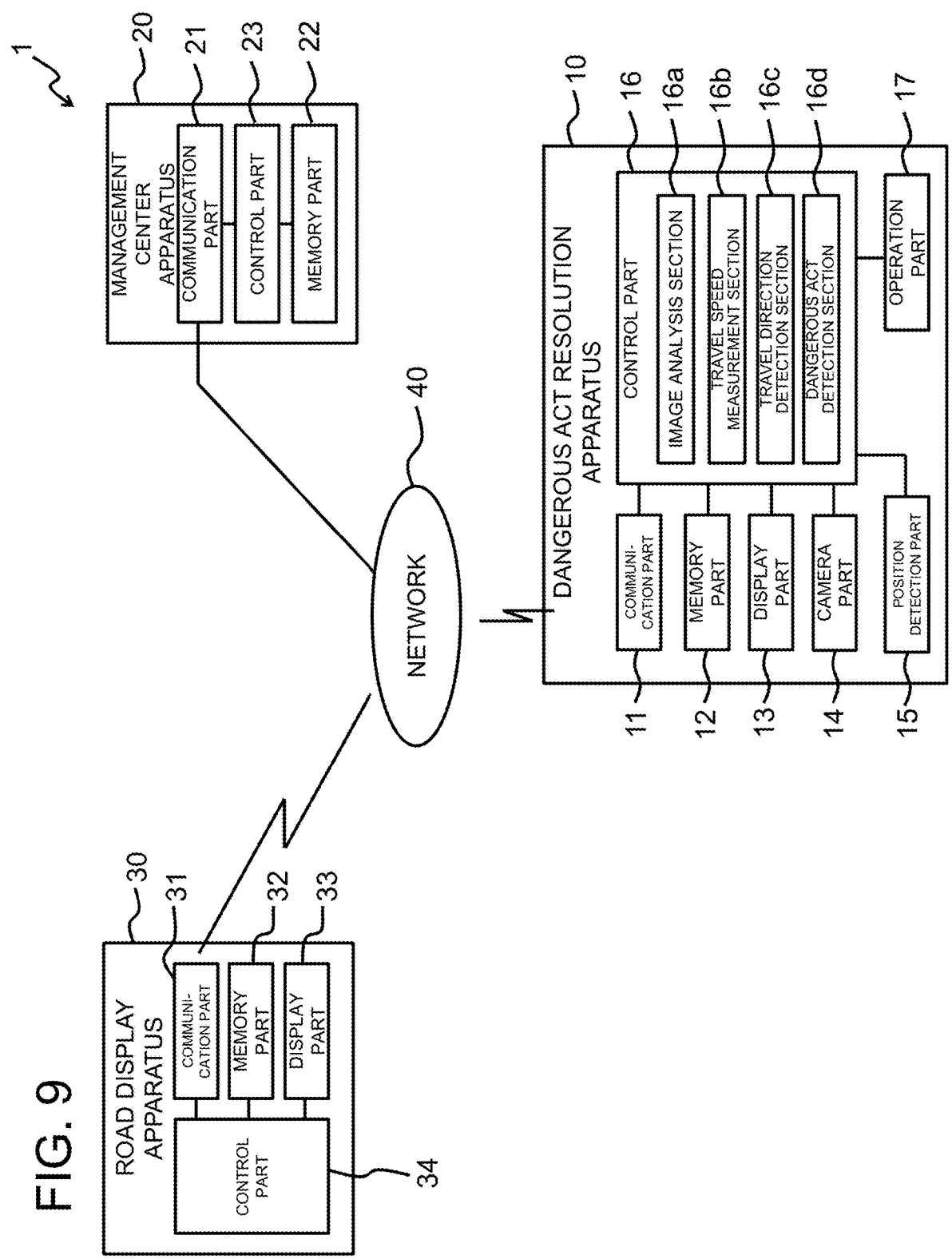
FIG. 9 is a block diagram schematically showing a configuration of a dangerous act resolution system according to a sixth exemplary embodiment.

A dangerous act resolution system according to a sixth exemplary embodiment will be described with reference to the drawings. FIG. 9 is a block diagram schematically showing a configuration of the dangerous act resolution system according to the sixth exemplary embodiment.

The sixth exemplary embodiment is a modification of the first exemplary embodiment, and is configured so that the driver of the own vehicle operates the operation part 17 (for example, switch, remote controller or the like) of the dangerous act resolution apparatus 10; the image data is taken by the camera section 14 of the dangerous act resolution apparatus 10 at an arbitrary timing desired by the driver; the taken image data is transmitted from the dangerous act resolution apparatus 10 to the management center apparatus 20; and the image data is stored in the storage section 22 of the management center apparatus 20. It can be stored for a certain period. The acquisition and transmission of the image data may be performed before or after the dangerous act detecting section 16*d* of the control part 16 of the dangerous act resolution apparatus 10 judges that the dangerous act occurs. Other configurations and operations are the same as those in the first exemplary embodiment. The sixth exemplary embodiment may be applied to the first to fifth exemplary embodiments.

According to the sixth exemplary embodiment, similarly to the first exemplary embodiment, since it is possible to warn (or be careful) to a vehicle performing a dangerous act by using the road display apparatus 30 with high visibility, it becomes easy that the driver of the following vehicle is aware of an own dangerous act, and it can contribute to resolve a situation in which the dangerous act of the following vehicle is received. Also, by saving image data taken by the dangerous act resolution apparatus 10 at an arbitrary timing desired by the driver, image data having better image-quality than image data automatically taken by the dangerous act resolution apparatus 10 can be used.

Seventh Exemplary Embodiment

Figure 10:
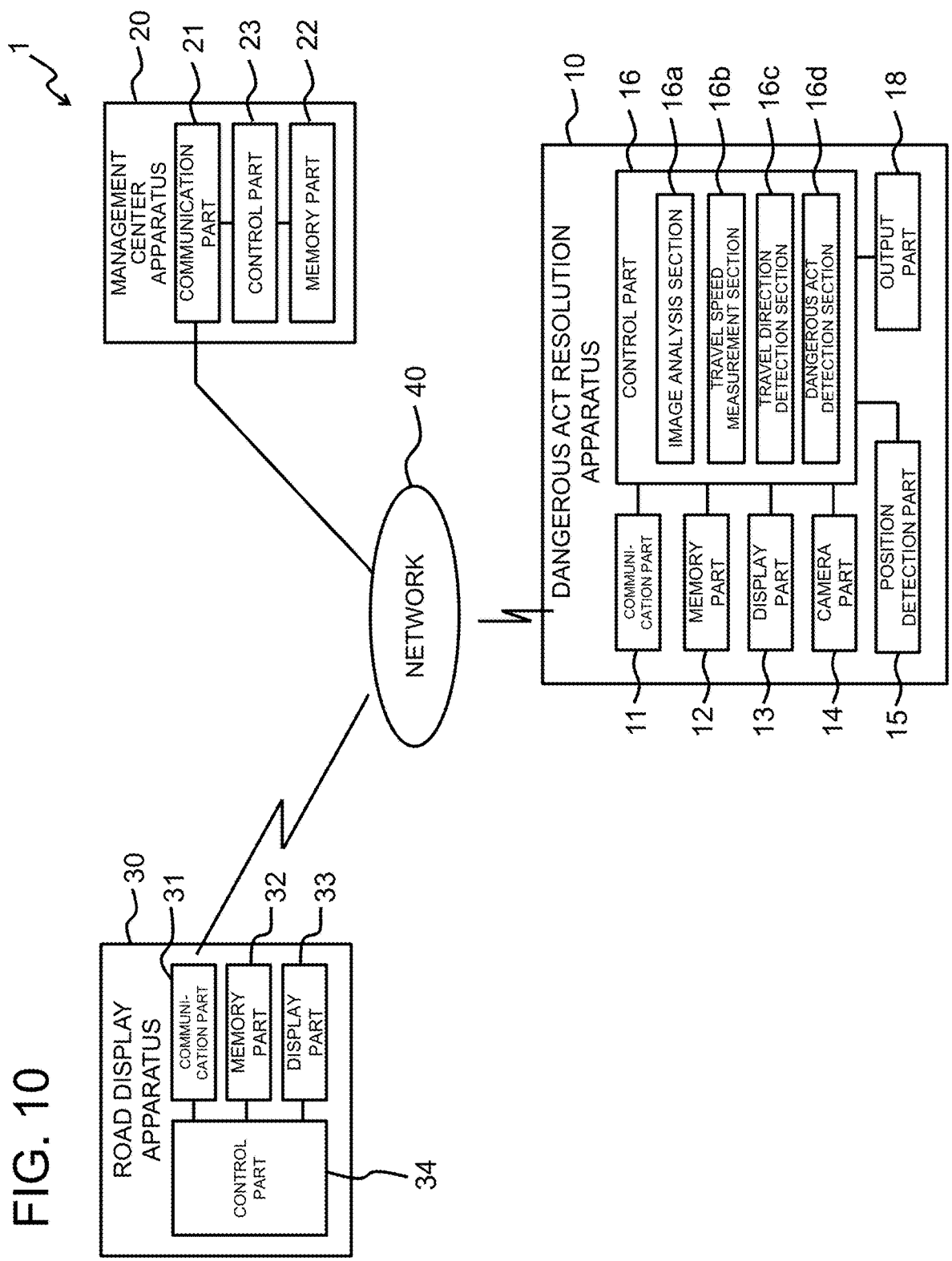
FIG. 10 is a block diagram schematically showing a configuration of a dangerous act resolution system according to a seventh exemplary embodiment.

A dangerous act resolution system according to a seventh exemplary embodiment will be described with reference to the drawings. FIG. 10 is a block diagram schematically showing a configuration of the dangerous act resolution system according to the seventh exemplary embodiment.

The seventh exemplary embodiment is a modification of the first exemplary embodiment, and is configured so that the output part 18 (function part for outputting excluding display; for example, a speaker part, a vibration part, an LED device or the like) incorporated in the dangerous act resolution apparatus 10 informs that a dangerous act occurs, when the dangerous act detecting section 16*d* of the control part 16 of the dangerous act resolution apparatus 10 detects the dangerous act of the following vehicle. For example, when using a speaker part as the output part 18, it can output a voice guidance such as "a dangerous act occurs"; when using a vibration part, it can be vibrated in a predetermined pattern; and when using an LED device, it can be flickered in a predetermined pattern. Also, the display part 13 of the dangerous act resolution apparatus 10 may perform a display for informing that a dangerous act occurs. Other configurations and operations are the same as those in the first exemplary embodiment. The seventh exemplary embodiment may be applied to the first to sixth exemplary embodiments.

According to the seventh exemplary embodiment, similarly to the first exemplary embodiment, since it is possible to warn (or be careful) to a vehicle performing a dangerous act by using the road display apparatus 30 with high visibility, it becomes easy that the driver of the following vehicle is aware of an own dangerous act, and it can contribute to resolve a situation in which the dangerous act of the following vehicle is received. Also, by informing that the dangerous act occurs on the display part 13 and the output part 18 in the dangerous act resolution apparatus 10, the driver of the own vehicle can also recognize that the dangerous act occurs early.

Eighth Exemplary Embodiment

A dangerous act resolution system according to an eighth exemplary embodiment will be described. Refer to FIG. 9 as to each component part of the dangerous act resolution system.

The eighth exemplary embodiment is a modification of the sixth exemplary embodiment, and is configured so that instead of the automatic detection by the dangerous act detecting section 16*d* of the control part 16 of the dangerous act resolution apparatus 10, the driver of the own vehicle operates the operation part 17 (for example, a switch, a remote controller or the like) of the dangerous act resolution apparatus 10, and the dangerous act detection information is transmitted to the management center apparatus 20.

For example, when the dangerous act detection section 16*d* is in a bad condition, image information (vehicle number of the following vehicle recognized by the image analysis section 16*a* is available) taken by the camera part 14 at an arbitrary timing desired by the driver; position information detected by the position detection part 15; travel speed information measured by the travel speed measurement section 16*b*; and travel direction information detected by the travel direction detection section 16*c* are acquired, and dangerous act detection information including the image information, the position information, the travel speed information, and the travel direction information that are acquired, is generated, and the generated dangerous act detection information is transmitted to the management center apparatus 20 through the communication part 11 and the network 40.

Other configurations and operations are the same as those in the sixth exemplary embodiment. The eighth exemplary embodiment may be applied to the first to seventh exemplary embodiments.

According to the eighth exemplary embodiment, similarly to the sixth exemplary embodiment, since it is possible to warn (or be careful) to a vehicle performing a dangerous act by using the road display apparatus 30 with high visibility, it becomes easy that the driver of the following vehicle is aware of an own dangerous act, and it can contribute to resolve a situation in which the dangerous act of the following vehicle is received. Also, by transmitting the dangerous act detection information to the management center apparatus 20 at an arbitrary timing desired by the driver, it is possible to transmit higher quality information than a case in which the dangerous act resolution apparatus 10 automatically transmits the dangerous act detection information. Further, when the dangerous act detection section 16*d* is in a bad condition or when the driver recognizes the dangerous act of the following vehicle before the dangerous act detection section 16*d*, the dangerous act detection information can be transmitted at a timing desired by the driver.

Ninth Exemplary Embodiment

A dangerous act resolution system according to a ninth exemplary embodiment 9 will be described. Refer to FIG. 1 as to each component part of the dangerous act resolution system.

The ninth exemplary embodiment is a modification of the first exemplary embodiment, and is configured so that the dangerous act resolution apparatus 10 periodically acquires the position information and the travel direction information detected by the position detection part 15 and the travel direction detection section 16c in the dangerous act detecting section 16d to transmit these to the management center apparatus 20. Other configurations and operations are the same as those in the first exemplary embodiment. The ninth exemplary embodiment may be applied to the first to eighth exemplary embodiments.

According to the ninth exemplary embodiment, similarly to the first exemplary embodiment, since it is possible to warn (or be careful) to a vehicle performing a dangerous act by using the road display apparatus 30 with high visibility, it becomes easy that the driver of the following vehicle is aware of an own dangerous act, and it can contribute to resolve a situation in which the dangerous act of the following vehicle is received. Also, it is useful for the management center apparatus 20 to select an appropriate road display apparatus 30 when the preceding vehicle turns right or left.

Tenth Exemplary Embodiment

A dangerous act resolution system according to a tenth exemplary embodiment 10 will be described. Refer to FIGS. 1 and 5 as to each component part and operations of the dangerous act resolution system.

The tenth exemplary embodiment is a modification of the first exemplary embodiment, and is configured so that a value added to the timer value in Step A11 in FIG. 5 or the alarm counter value in Step A9 can be changed in the dangerous act detection section 16d of the control part 16 of the dangerous act resolution apparatus 10. Other configurations and operations are the same as those in the first exemplary embodiment. The tenth exemplary embodiment may be applied to the first to ninth exemplary embodiments.

According to the tenth exemplary embodiment, similarly to the first exemplary embodiment, since it is possible to warn (or be careful) to a vehicle performing a dangerous act by using the road display apparatus 30 with high visibility, it becomes easy that the driver of the following vehicle is aware of an own dangerous act, and it can contribute to resolve a situation in which the dangerous act of the following vehicle is received. Also, the sensitivity for detecting a dangerous act by the dangerous act detection section 16d can be increased or decreased.

Eleventh Exemplary Embodiment

Figure 11:
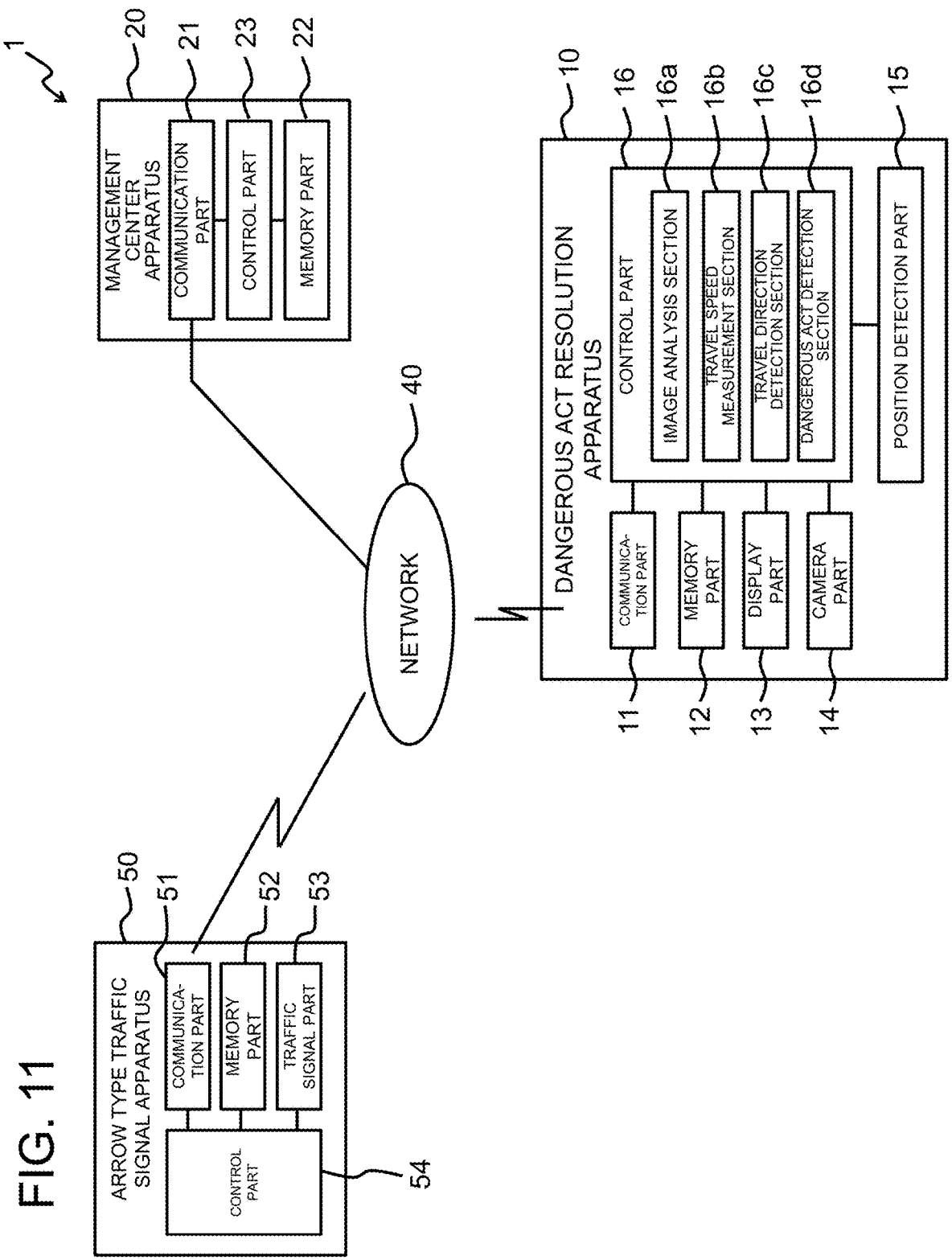
FIG. 11 is a block diagram schematically showing a configuration of a dangerous act resolution system according to an eleventh exemplary embodiment.
Figure 12:
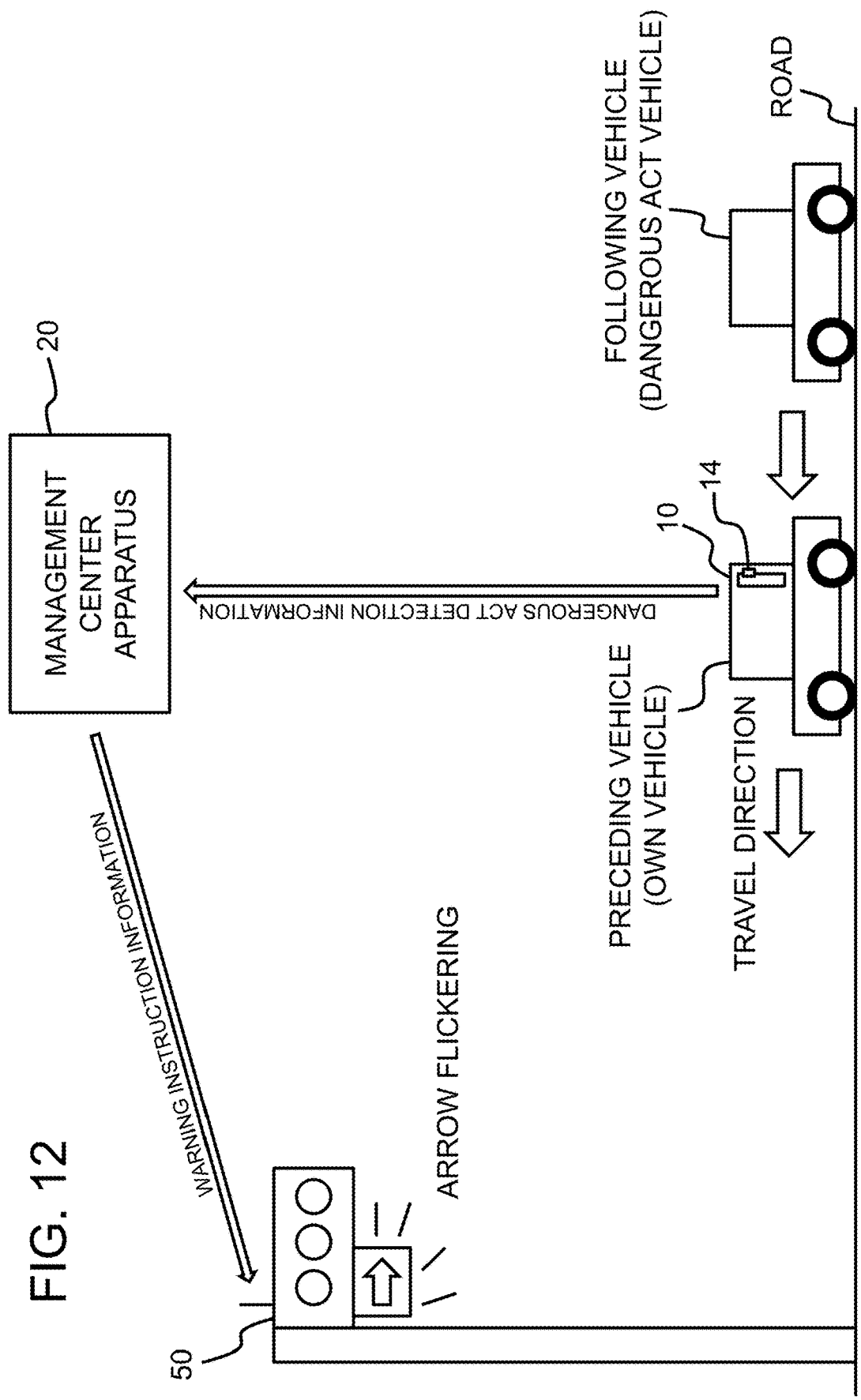
FIG. 12 is an image diagram schematically showing the configuration of the dangerous act resolution system according to the eleventh exemplary embodiment.

A dangerous act resolution system according to an eleventh exemplary embodiment will be described with reference to the drawings. FIG. 11 is a block diagram schematically showing a configuration of the dangerous act resolution system according to the eleventh exemplary embodiment. FIG. 12 is an image diagram schematically showing the configuration of the dangerous act resolution system according to the eleventh exemplary embodiment.

The eleventh exemplary embodiment is a modification of the first exemplary embodiment, and is configured to use an arrow type traffic signal apparatus 50 instead of the road display apparatus 30 of FIG. 1.

The arrow type traffic signal apparatus 50 is a traffic signal apparatus (warning output apparatus) capable of displaying an arrow and set on the road (see FIGS. 11 and 12). The arrow type traffic signal apparatus 50 comprises: a communication part 51; a memory part 52; a traffic signal part 53, and a control part 54, as main function parts.

The communication part 51 is a function part (for example, an interface or the like) for communicating (transmitting/receiving) information (see FIG. 11). The communication part 51 is communicably connected to the network 40 by wireless (or wire).

The memory part 52 is a function part for storing information such as various data, programs, and files (see FIG. 11). As the memory part 52, for example, a storage device such as a ROM (Read Only Memory) or a RAM (Random Access Memory) can be used.

The traffic signal part 53 is a function part for indicating signals such as progress permission and stop instruction (see FIG. 11). The traffic signal part 53 turns on or off the progress permission signal in an arrow direction(s) in addition to turning on or off three-color-signals consisting of blue, yellow, and red.

The control part 54 is a function part that controls the communication part 51, the memory part 52, and the traffic signal part 53 (see FIG. 11). The control part 54 controls the communication part 51 to transmit/receive information to/from the management center apparatus 20. The control part 54 writes/reads data to/from the memory part 52. The control part 54 controls the traffic signal part 53 to turn on or off the signals of the traffic signal part 53. The control part 54 performs predetermined information processing by executing a program.

The control part 54 receives the warning output instruction information from the management center apparatus 20 through the communication part 51; and thereby causes the traffic signal part 53 to flicker the arrow signal for a certain time so as to urge the following vehicle to quit a dangerous act.

When the arrow signal flickers, it is disseminated in the society that there is a vehicle performing a dangerous act(s) nearby and that it is instructed to stop the act(s).

Other configurations and operations are the same as those in the first exemplary embodiment. The eleventh exemplary embodiment may be combined with the first to tenth exemplary embodiments.

According to the eleventh exemplary embodiment, similarly to the first exemplary embodiment, since it is possible to warn (or be careful) to a vehicle performing a dangerous act by using the road display apparatus 30 with high visibility, it becomes easy that the driver of the following vehicle is aware of an own dangerous act, and it can contribute to resolve a situation in which the dangerous act of the following vehicle is received. Also, since there are more arrow type traffic signal apparatuses 50 than the road display apparatus 30 of FIG. 1, it becomes easy that the driver of the following vehicle is aware effectively of an own dangerous act.

Twelfth Exemplary Embodiment

Figure 13:
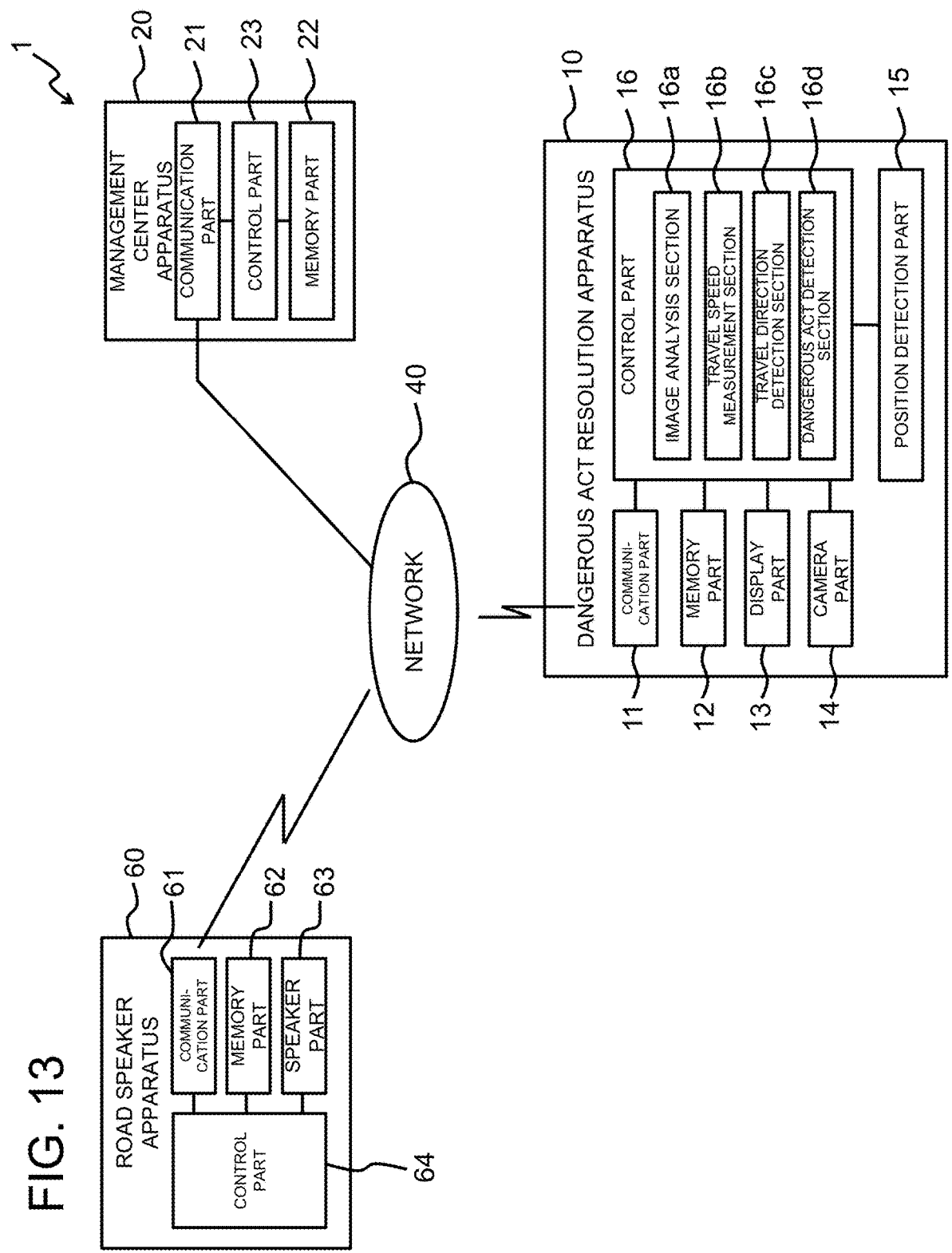
FIG. 13 is a block diagram schematically showing a configuration of a dangerous act resolution system according to a twelfth exemplary embodiment.
Figure 14:
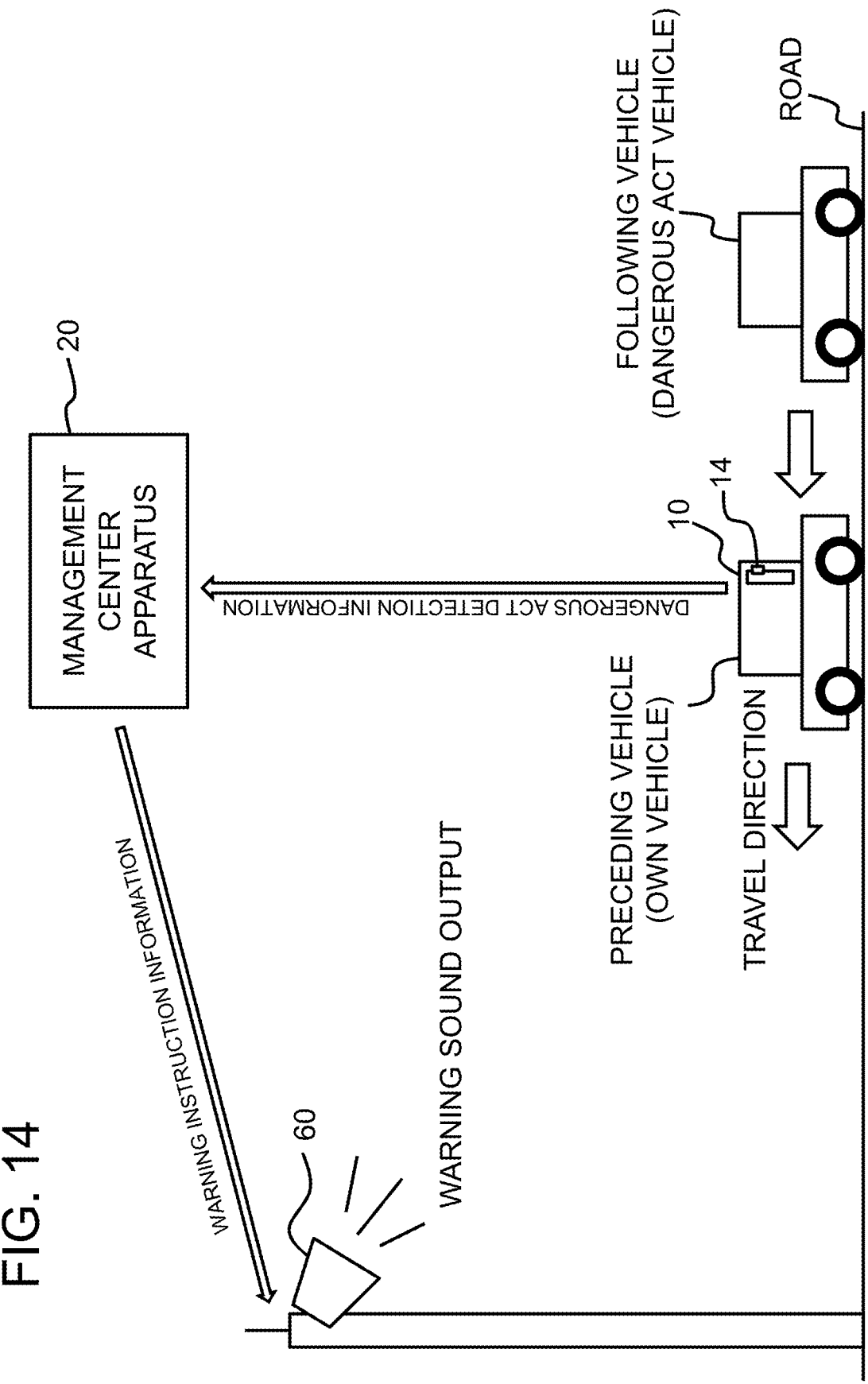
FIG. 14 is an image diagram schematically showing the configuration of the dangerous act resolution system according to the twelfth exemplary embodiment.

A dangerous act resolution system according to a twelfth exemplary embodiment will be described with reference to the drawings. FIG. 13 is a block diagram schematically showing a configuration of the dangerous act resolution system according to the twelfth exemplary embodiment. FIG. 14 is an image diagram schematically showing the configuration of the dangerous act resolution system according to the twelfth exemplary embodiment.

The twelfth exemplary embodiment is a modification of the first exemplary embodiment, and is configured to use a road speaker apparatus 60 instead of the road display apparatus 30 of FIG. 1.

The road speaker apparatus 60 is a speaker apparatus (warning output apparatus) that is installed on a road and outputs sound (see FIGS. 13 and 14). The road speaker apparatus 60 comprises: a communication part 61; a memory part 62; a speaker part 63; and a control part 64, as main function parts.

The communication part 61 is a function part (for example, an interface or the like) for communicating (transmitting/receiving) information (see FIG. 13). The communication part 61 is communicably connected to the network 40 by wireless (or wire).

The memory part 62 is a function part for storing information such as various data, programs, and files (see FIG. 13). As the memory part 62, for example, a storage device such as a ROM (Read Only Memory) or a RAM (Random Access Memory) can be used.

The speaker part 63 is a function part for outputting sound (see FIG. 13). As the speaker part 63, for example, a highly directional speaker can be used.

The control part 64 is a function part for controlling the communication part 61, the memory part 62, and the speaker part 63 (see FIG. 13). The control part 64 controls the communication part 61 to transmit/receive information to/from the management center apparatus 20. The control part 64 writes/reads data to/from the memory part 62. The control part 64 controls the speaker part 63 to output sound from the speaker part 63. The control part 64 performs predetermined information processing by executing a program.

The control part 64 receives the warning output instruction information from the management center apparatus 20 through the communication part 61; and thereby causes the speaker part 63 to output a predetermined warning (voice guidance or the like) by sound for a certain time so as to urge the following vehicle to quit a dangerous act.

Other configurations and operations are the same as those in the first exemplary embodiment. The twelfth exemplary embodiment may be combined with the first to eleventh exemplary embodiments.

According to the twelfth exemplary embodiment, similarly to the first exemplary embodiment, since it is possible to warn (or be careful) to a vehicle performing a dangerous act by using the road display apparatus 30 with high visibility, it becomes easy that the driver of the following vehicle is aware of an own dangerous act, and it can contribute to resolve a situation in which the dangerous act of the following vehicle is received. Also, it becomes easy that the driver of the following vehicle is aware effectively of an own dangerous act due to the warning by sound.

Thirteenth Exemplary Embodiment

Figure 15:
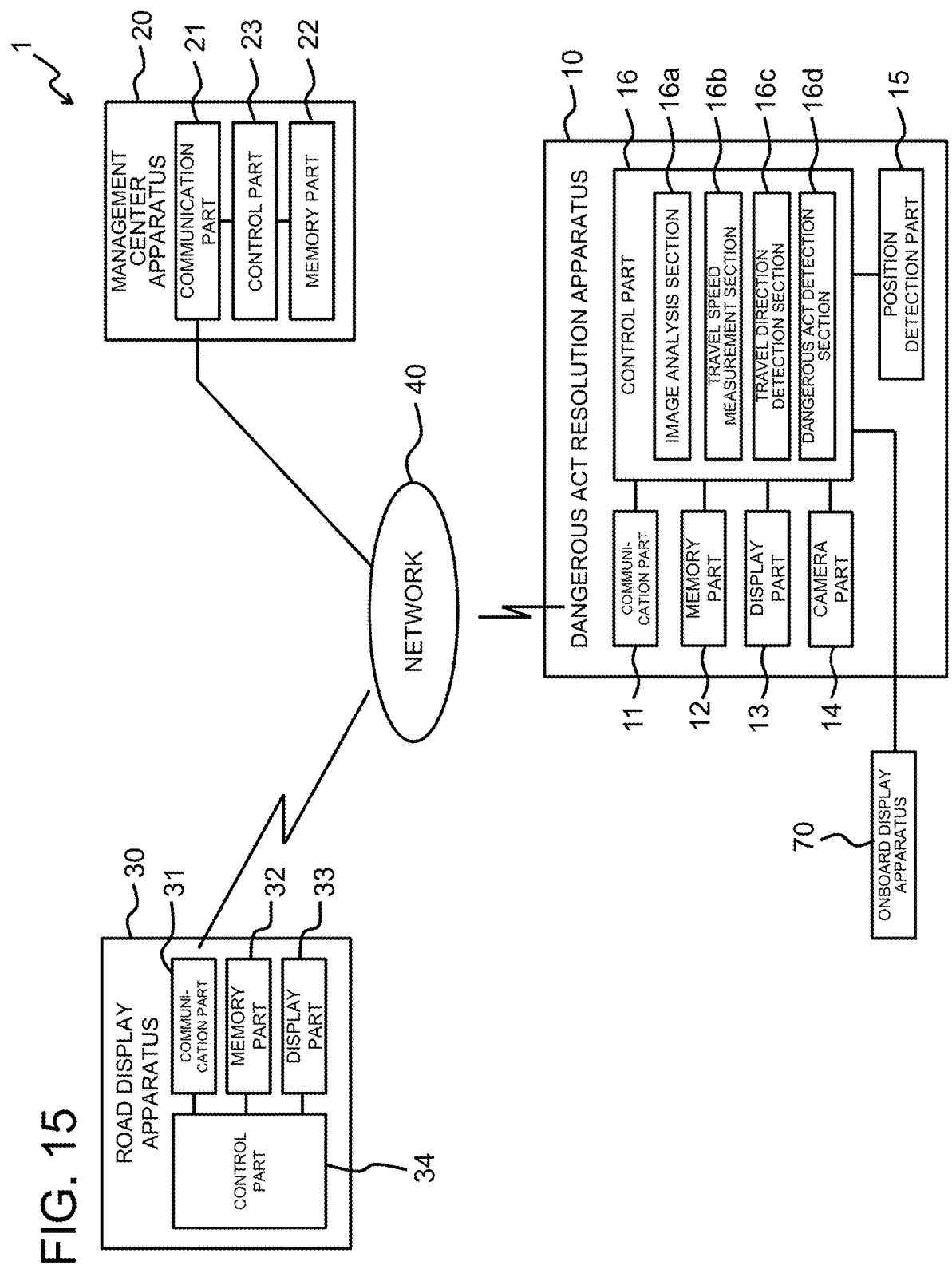
FIG. 15 is a block diagram schematically showing a configuration of a dangerous act resolution system according to a thirteenth exemplary embodiment.
Figure 16:
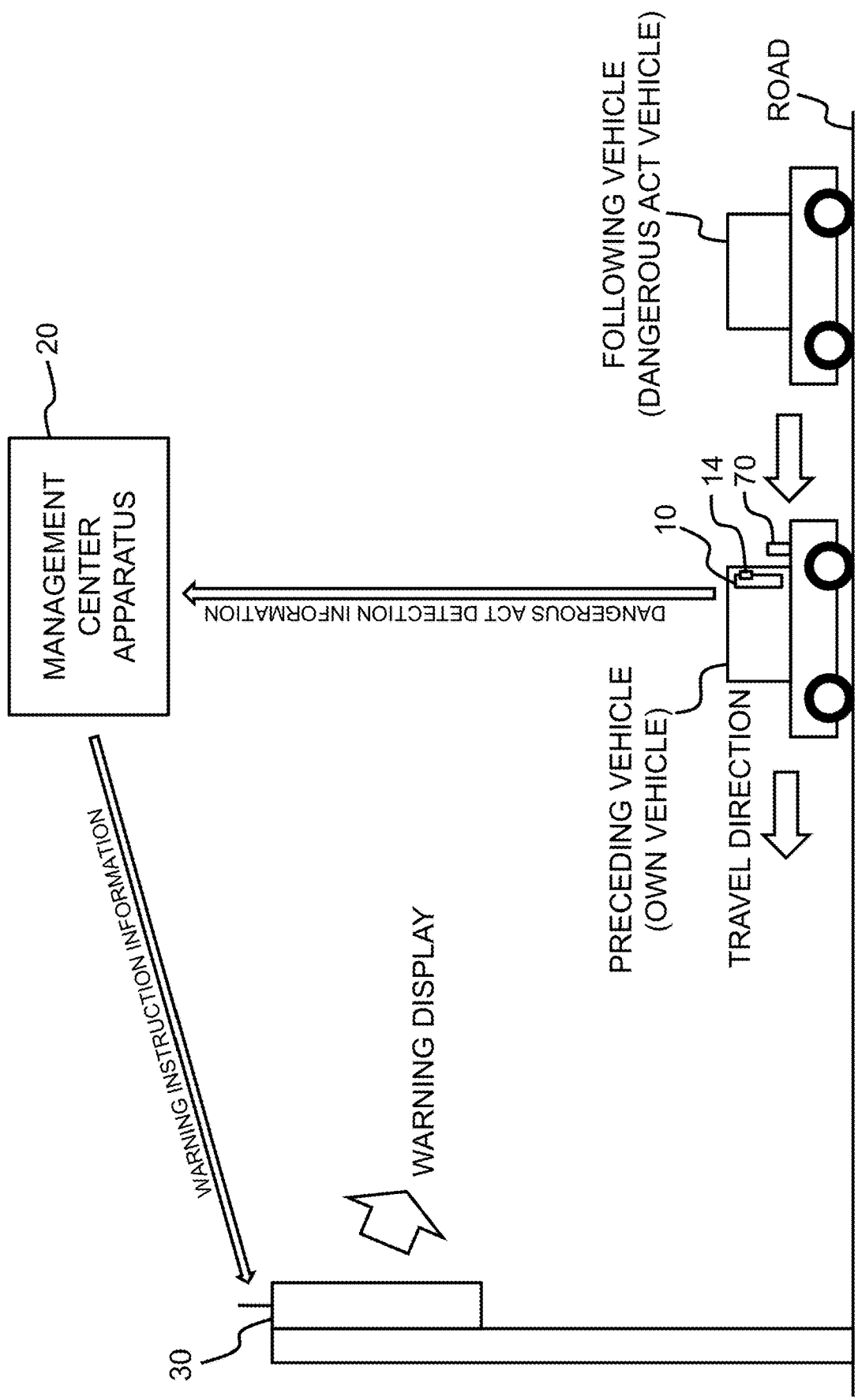
FIG. 16 is an image diagram schematically showing the configuration of the dangerous act resolution system according to the thirteenth exemplary embodiment.

A dangerous act resolution system according to a thirteenth exemplary embodiment will be described with reference to the drawings. FIG. 15 is a block diagram schematically showing a configuration of the dangerous act resolution system according to the thirteenth exemplary embodiment. FIG. 16 is an image diagram schematically showing the configuration of the dangerous act resolution system according to the thirteenth exemplary embodiment.

The thirteenth exemplary embodiment is a modification of the fourth exemplary embodiment, and is configured to display the warning content on an onboard display apparatus 70 (for example, a character display board) externally attached to the own vehicle, instead of displaying the warning content on the display part 13.

The onboard display apparatus 70 is a display apparatus mounted on a vehicle. The onboard display apparatus 70 is arranged in the own vehicle to be visible from the following vehicle and is arranged not to interfere with the camera part 14 of the dangerous act resolution apparatus 10. The display content (warning content) displayed on the onboard display apparatus 70 is controlled by the control part 16 of the dangerous act resolution apparatus 10. The onboard display apparatus 70 displays a warning content when the dangerous act is detected by the dangerous act detection section 16d. The onboard display apparatus 70 may be electrically connected to the dangerous act resolution apparatus 10 by wire or may be communicably connected to it by wireless.

Other configurations and operations are the same as those in the fourth exemplary embodiment. The thirteenth exemplary embodiment may be combined with the first to twelfth exemplary embodiments.

According to the thirteenth exemplary embodiment, similarly to the fourth exemplary embodiment, since it is possible to warn (or be careful) to a vehicle performing a dangerous act by using the road display apparatus 30 with high visibility, it becomes easy that the driver of the following vehicle is aware of an own dangerous act, and it can contribute to resolve a situation in which the dangerous act of the following vehicle is received. Also, it becomes easy that the driver of the following vehicle is aware that an own is warned due to the warning by displaying the warning content on the onboard display apparatus 70 arranged to be visible from the following vehicle.

Fourteenth Exemplary Embodiment

Figure 17:
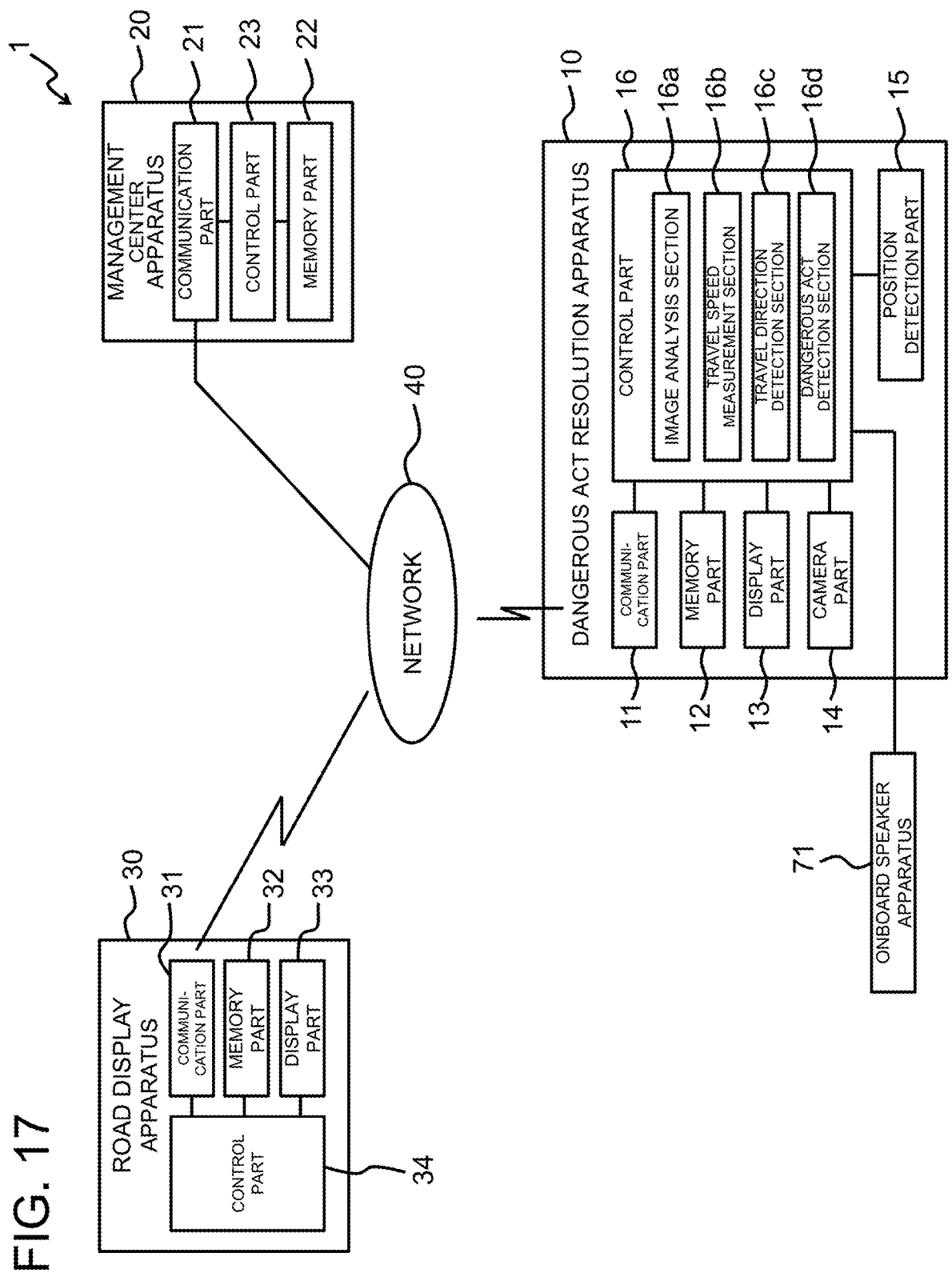
FIG. 17 is a block diagram schematically showing a configuration of a dangerous act resolution system according to a fourteenth exemplary embodiment.

A dangerous act resolution system according to a fourteenth exemplary embodiment will be described with reference to the drawings. FIG. 17 is a block diagram schematically showing a configuration of the dangerous act resolution system according to the fourteenth exemplary embodiment.

The fourteenth exemplary embodiment is a modification of the first exemplary embodiment, and is configured to output warning contents by sound from an onboard speaker apparatus 71 externally attached to the own vehicle.

The onboard speaker apparatus 71 is a speaker apparatus mounted on a vehicle. The onboard speaker apparatus 71 is arranged in the own vehicle so as to output a sound to the following vehicle and is arranged so as not to interfere with the camera part 14 of the dangerous act resolution apparatus 10. A sound output (warning content) of the onboard speaker apparatus 71 is controlled by the control part 16 of the dangerous act resolution apparatus 10. The onboard speaker apparatus 71 outputs a warning content by sound when a dangerous act is detected by the dangerous act detection section 16d. The onboard speaker apparatus 71 may be electrically connected to the dangerous act resolution apparatus 10 by wire or may be communicably connected to it by wireless.

Other configurations and operations are the same as those in the first exemplary embodiment. The fourteenth exemplary embodiment may be combined with the first to thirteenth exemplary embodiments.

According to the fourteenth exemplary embodiment, similarly to the first exemplary embodiment, since it is possible to warn (or be careful) to a vehicle performing a dangerous act by using the road display apparatus 30 with high visibility, it becomes easy that the driver of the following vehicle is aware of an own dangerous act, and it can contribute to resolve a situation in which the dangerous act of the following vehicle is received. Also, it becomes easy that the driver of the following vehicle is aware that an own is warned by outputting the warning content as sound from the onboard speaker apparatus 71 arranged so as to output toward the following vehicle.

Fifteenth Exemplary Embodiment

Figure 18:
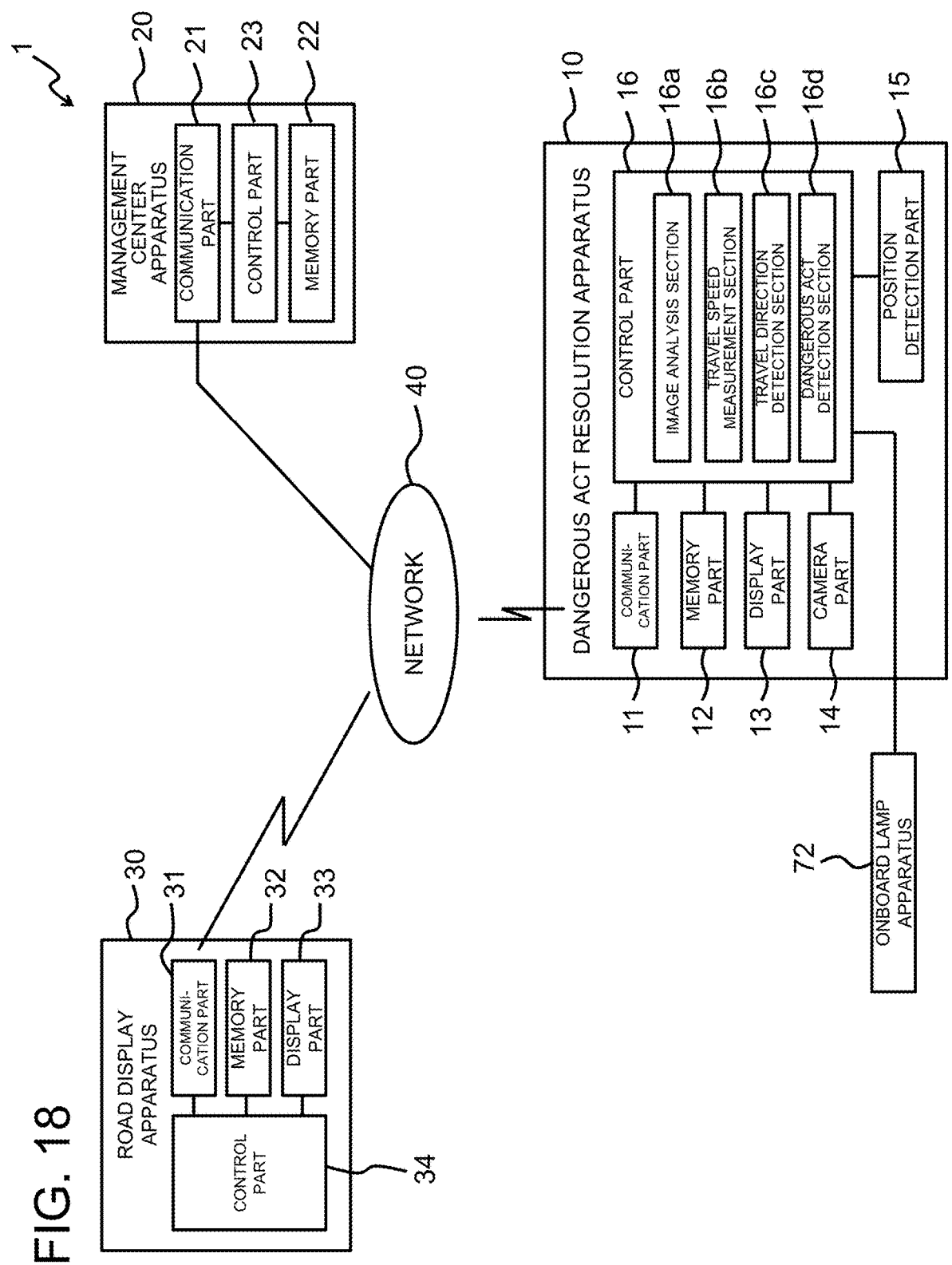
FIG. 18 is a block diagram schematically showing a configuration of a dangerous act resolution system according to a fifteenth exemplary embodiment.

A dangerous act resolution system according to a fifteenth exemplary embodiment will be described with reference to the drawings. FIG. 18 is a block diagram schematically showing a configuration of the dangerous act resolution system according to the fifteenth exemplary embodiment.

The fifteenth exemplary embodiment is a modification of the first exemplary embodiment, and is configured to flicker for indicating a warning on the onboard lamp apparatus 72 of the own vehicle.

The onboard lamp apparatus 72 is a lamp apparatus that is mounted on a vehicle and outputs light. As the onboard lamp apparatus 72, for example, a vehicle width lamp already provided in the vehicle, or the like can be used. A sound-output (warning content) of the onboard lamp apparatus 72 is controlled by the control part 16 of the dangerous act resolution apparatus 10. The onboard lamp apparatus 72 flickers for indicating a warning when a dangerous act is detected by the dangerous act detection section 16d. As an example of flickering for indicating a warning, flickering at a SOS (Save Our Souls) rhythm of Morse code; flickering at high speed; flickering of only one vehicle width lamp; and the like are listed. The onboard lamp apparatus 72 may be electrically connected to the dangerous act resolution apparatus 10 by wire or may be communicably connected to it by wireless.

Other configurations and operations are the same as those in the first exemplary embodiment. The fifteenth exemplary embodiment may be combined with the first to fourteenth exemplary embodiments.

According to the fifteenth exemplary embodiment, similarly to the first exemplary embodiment, since it is possible to warn (or be careful) to a vehicle performing a dangerous act by using the road display apparatus 30 with high visibility, it becomes easy that the driver of the following vehicle is aware of an own dangerous act, and it can contribute to resolve a situation in which the dangerous act of the following vehicle is received. Also, it becomes easy that the driver of the following vehicle is aware that an own is warned by flickering for indicating a warning on the onboard lamp apparatus 72 already provided for notifying the driving situation (left turn, right turn, stop, or the like) to the following vehicle.

Sixteenth Exemplary Embodiment

A dangerous act resolution system according to a sixteenth exemplary embodiment will be described. Refer to FIG. 1 as to each component part of the dangerous act resolution system.

The sixteenth exemplary embodiment is a modification of the first exemplary embodiment, and is configured to use an existing onboard apparatus such as a car navigation system, as a dangerous act resolution apparatus 10 instead of a mobile communication apparatus such as a smartphone or a tablet terminal. Other configurations and operations are the same as those in the first exemplary embodiment. The sixteenth exemplary embodiment may be applied to the first to fifteenth exemplary embodiments.

According to the sixteenth exemplary embodiment, similarly to the first exemplary embodiment, since it is possible to warn (or be careful) to a vehicle performing a dangerous act by using the road display apparatus 30 with high visibility, it becomes easy that the driver of the following vehicle is aware of an own dangerous act, and it can contribute to resolve a situation in which the dangerous act of the following vehicle is received. Also, an onboard apparatus already mounted on a vehicle can be effectively used.

Seventeenth Exemplary Embodiment

Figure 19:
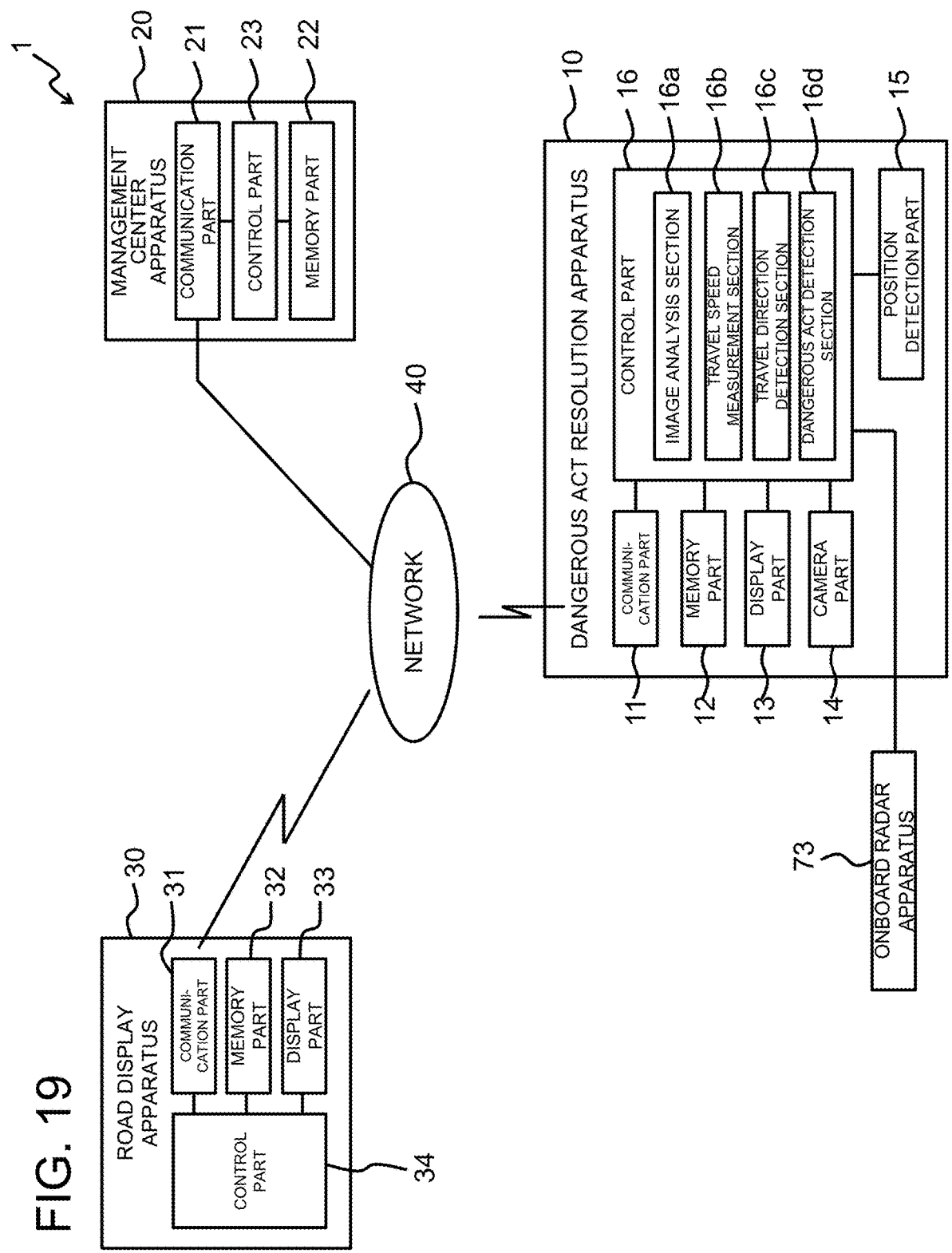
FIG. 19 is a block diagram schematically showing a configuration of a dangerous act resolution system according to a seventeenth exemplary embodiment.

A dangerous act resolution system according to a seventeenth exemplary embodiment will be described with reference to the drawings. FIG. 19 is a block diagram schematically showing a configuration of the dangerous act resolution system according to the seventeenth exemplary embodiment.

The seventeenth exemplary embodiment is a modification of the first exemplary embodiment, and is configured to judge the vehicle-to-vehicle distance between the preceding vehicle and the following vehicle by using an existing onboard radar apparatus 73, instead of judging whether the vehicle size of the following vehicle exceeds the threshold by using the camera part 14 and the image analysis section 16a as Step A7 of FIG. 5.

The onboard radar apparatus 73 is a radar apparatus mounted on a vehicle. As the onboard radar apparatus 73, for example, a rear warning radar apparatus already provided in the vehicle can be used. The onboard radar apparatus 73 can be controlled by the control part 16 of the dangerous act resolution apparatus 10. The onboard radar apparatus 73 may be electrically connected to the dangerous act resolution apparatus 10 by wire or may be communicably connected to it by wireless.

Other configurations and operations are the same as those in the first exemplary embodiment. The seventeenth exemplary embodiment may be applied to the second to sixteenth exemplary embodiments.

According to the seventeenth exemplary embodiment, similarly to the first exemplary embodiment, since it is possible to warn (or be careful) to a vehicle performing a dangerous act by using the road display apparatus 30 with high visibility, it becomes easy that the driver of the following vehicle is aware of an own dangerous act, and it can contribute to resolve a situation in which the dangerous act of the following vehicle is received. Also, the onboard radar apparatus 73 already mounted on a vehicle can be effectively used.

Eighteenth Exemplary Embodiment

A dangerous act resolution system according to an eighteenth exemplary embodiment will be described. Refer to FIGS. 1 and 5 as to each component part of the dangerous act resolution system.

The eighteenth exemplary embodiment is a modification of the first exemplary embodiment, and is configured to install the dangerous act resolution apparatus 10 so that the camera part 14 takes the side (parallel running vehicle) of the own vehicle, instead of installing the dangerous act resolution apparatus 10 so that the camera part 14 takes the rear (following vehicle) of the own vehicle. This is used for detecting the parallel running vehicle as a dangerous act vehicle when the parallel running vehicle continues to pull near to the side of the own vehicle (when the width of the own vehicle and the parallel running vehicle, the running speed, and the continuation time exceed the threshold); and resolving a situation thereof. Other configurations and operations are the same as those in the first exemplary embodiment. The eighteenth exemplary embodiment may be combined with the first to seventeenth exemplary embodiments.

According to the eighteenth exemplary embodiment, since it is possible to warn (or be careful) to a parallel running vehicle performing a dangerous act (driving pulling near to the side) by using the road display apparatus 30 with high visibility, it becomes easy that the driver of the parallel running vehicle is aware of an own dangerous act, and it can contribute to resolve a situation in which the dangerous act of the parallel running vehicle is received.

Nineteenth Exemplary Embodiment

A dangerous act resolution system according to a nineteenth exemplary embodiment will be described. Refer to FIGS. 1 and 5 as to each component part and operations of the dangerous act resolution system.

The nineteenth exemplary embodiment is a modification of the first exemplary embodiment, and is configured to install the dangerous act resolution apparatus 10 so that the camera part 14 takes the front (preceding vehicle) of the own vehicle, instead of installing the dangerous act resolution apparatus 10 so that the camera part 14 takes the rear (following vehicle) of the own vehicle. This is used for detecting a vehicle that intentionally drives at a low speed (performs a dangerous act) in the front of the own vehicle on a highway or the like; and resolving the situation thereof. Other configurations and operations are the same as those in the first exemplary embodiment. The nineteenth exemplary embodiment may be combined with the first to eighteenth exemplary embodiments.

According to the nineteenth exemplary embodiment, since it is possible to warn (or be careful) to a preceding vehicle performing a dangerous act (intentional low speed driving) by using the road display apparatus 30 with high visibility, it becomes easy that the driver of the preceding vehicle is aware of an own dangerous act, and it can contribute to resolve a situation in which the dangerous act of the preceding vehicle is received.

Twentieth Exemplary Embodiment

Figure 20:
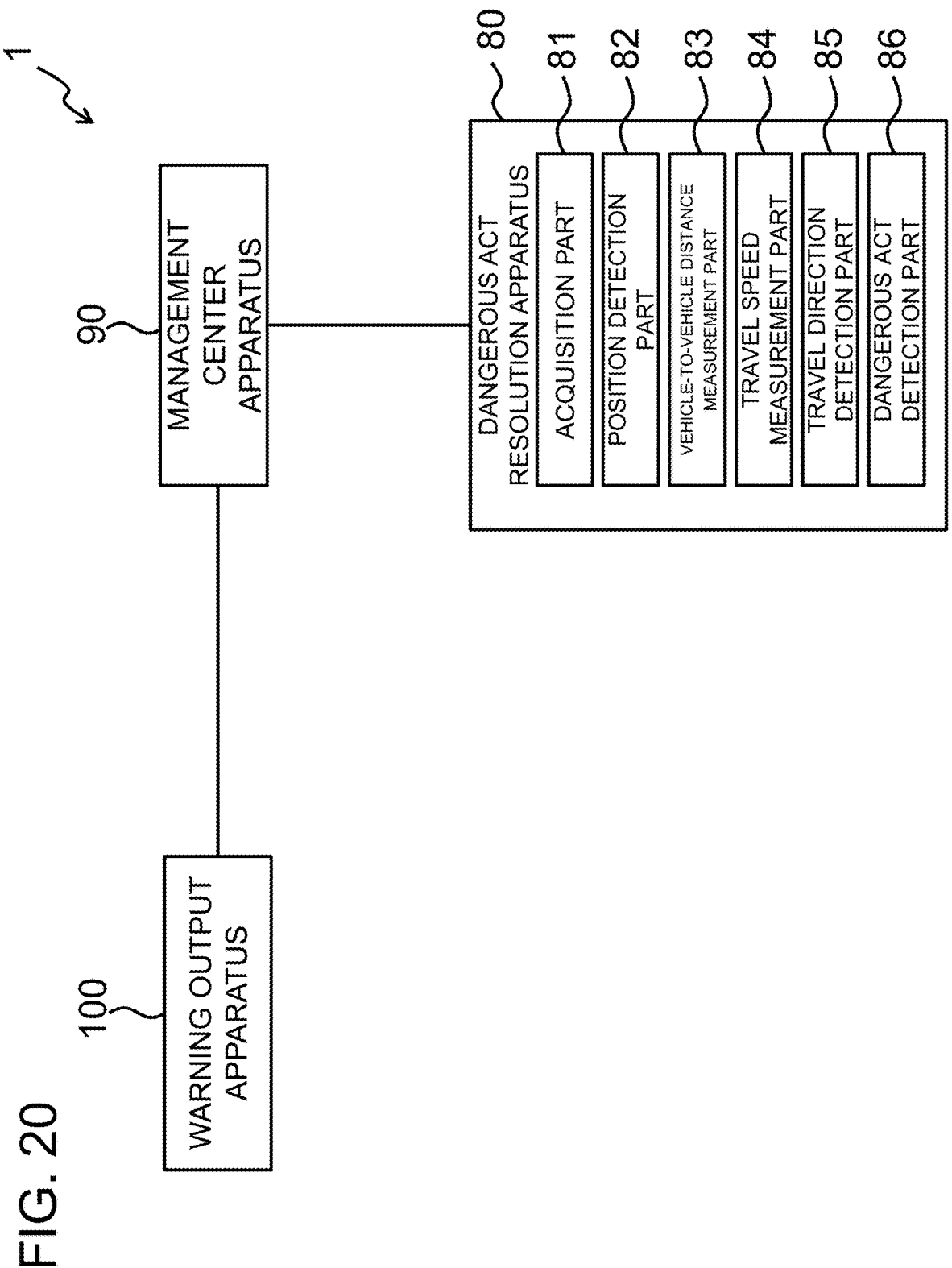
FIG. 20 is a block diagram schematically showing a configuration of a dangerous act resolution system according to a twentieth exemplary embodiment.

A dangerous act resolution system according to a twentieth exemplary embodiment will be described with reference to the drawings. FIG. 20 is a block diagram schematically showing a configuration of the dangerous act resolution system according to the twentieth exemplary embodiment.

The dangerous act resolution system 1 is a system for resolving a dangerous act of a peripheral vehicle of an own vehicle. The dangerous act resolution system 1 comprises: a dangerous act resolution system 80; a management center apparatus 90; and a warning output apparatus 100.

The dangerous act resolution apparatus 80 is an apparatus communicably connected to the management center apparatus 90; is installed in an own vehicle; and instructs the management center apparatus 90 to resolve a dangerous act when a dangerous act of a peripheral vehicle traveling around the vehicle is detected. The dangerous act resolution apparatus 80 comprises: an acquisition part 81; a position detection part 82; a vehicle-to-vehicle distance measurement part 83, a travel speed measurement part 84, a travel direction detection part 85, and a dangerous act detection part 86.

The acquisition part 81 acquires peripheral vehicle specific information for specifying a peripheral vehicle. The position detection part 82 detects a position of the own vehicle. The vehicle-to-vehicle distance measurement part 83 measures a vehicle-to-vehicle distance between the own vehicle and the peripheral vehicle. The travel speed measurement part 84 measures a travel speed of the own vehicle. The travel direction detection part 85 detects a travel direction of the own vehicle. The dangerous act detection part 86 judges that a dangerous act occurs when a situation in which the vehicle-to-vehicle distance is shorter than a preset first threshold and the travel speed exceeds a preset second threshold occurs within a predetermined time; and transmits dangerous act detection information including information according to the peripheral vehicle specific information, the position, the travel speed and the travel direction to the management center apparatus 90.

The management center apparatus 90 is an apparatus that is communicably connected to the warning output apparatus 100 and controls the warning output apparatus 100. The management center apparatus 90 receives the dangerous act detection information; and thereby select the warning output apparatus 100 at a position where the vehicle and the peripheral vehicle pass, due to use of a preset warning output apparatus database, based on the position, the travel speed, and the travel direction of the dangerous act detection information. The management center apparatus 90 transmits warning output instruction information to the selected warning output apparatus 100, the warning output instruction information being information for instructing to output a warning including the peripheral vehicle specific information.

The warning output apparatus 100 outputs a warning. The warning output apparatus 100 receives the warning output instruction information; and thereby outputs a warning including the peripheral vehicle specific information.

According to the twentieth exemplary embodiment, it is possible to contribute to resolve a situation in which the dangerous act of the peripheral vehicle is received, by outputting a warning including the peripheral vehicle specific information by the warning output apparatus 100 at a position where the vehicle and the peripheral vehicle pass, when a dangerous act of a peripheral vehicle occurs in the own vehicle on which the dangerous act resolution apparatus 80 is mounted.

A part or all of the above-described exemplary embodiment can be described as the following appendix, but is not limited thereto.

APPENDIX

In the present invention, it is possible to adopt the mode of the dangerous act resolution system according to the first aspect.

In the dangerous act resolution system according to the first aspect, the acquisition part is a camera part that takes images of the peripheral vehicles, and the peripheral vehicle specific information is the images.

In the dangerous act resolution system according to the first aspect, the acquisition part comprises: a camera part that takes images of the peripheral vehicles; and an image analysis section that analyzes the image to recognize a vehicle number of the peripheral vehicle, and the peripheral vehicle specific information is the vehicle number.

In the dangerous act resolution system according to the first aspect, the dangerous act detection part judges whether or not a dangerous act occurs, by using: a timer value counting a time after the start of detection of a dangerous act; and an alarm counter value counting a continuation of a situation in which the vehicle-to-vehicle distance is shorter than the first threshold and the travel speed exceeds the second threshold.

In the dangerous act resolution system according to the first aspect, the dangerous act detection part judges that a dangerous act occurs, when the timer value is smaller than a preset first predetermined value and the alarm counter value is greater than a preset second predetermined value, in a situation in which the vehicle-to-vehicle distance is shorter than the first threshold and the travel speed exceeds the second threshold.

In the dangerous act resolution system according to the first aspect, the dangerous act resolution apparatus further comprises a camera part that takes an image of the peripheral vehicle, and the vehicle-to-vehicle distance measurement part is an image analysis section that measures the vehicle-to-vehicle distance according to a relative relationship between a preset third threshold and a vehicle size displayed in the image.

In the dangerous act resolution system according to the first aspect, the vehicle-to-vehicle distance measurement part changes the third threshold according to a travel speed.

In the dangerous act resolution system according to the first aspect, the dangerous act resolution apparatus further comprises a light intensity detection part that detects a light intensity of the light from the peripheral vehicle, and the vehicle-to-vehicle distance measurement part is a light intensity analysis part that measures the vehicle-to-vehicle distance according to a relative relationship between a preset fourth threshold and the light intensity.

In the dangerous act resolution system according to the first aspect, the management center apparatus is configured to: receive the dangerous act detection information a plurality of times; thereby select the warning output apparatus at a position where the vehicle and the peripheral vehicle pass, due to use of a preset warning output apparatus database, based on the position, the travel speed, and the travel direction of the latest dangerous act detection information; and transmit a second warning output instruction information for instructing the selected warning output apparatus to output a warning escalated from the previous time, and the warning output apparatus is configured to: receive the second warning output instruction information; and thereby output the warning escalated from the previous time.

In the dangerous act resolution system according to the first aspect, the dangerous act resolution apparatus further comprises a display part that displays information, and the dangerous act resolution apparatus is installed on the vehicle so that the display part can be seen to the peripheral vehicle.

In the dangerous act resolution system according to the first aspect, the dangerous act detection part is configured to: judge that a dangerous act occurs continuously when a situation in which the vehicle-to-vehicle distance is shorter than the first threshold and the travel speed exceeds the second threshold occurs continuously within a predetermined time; and transmit the dangerous act continuation detection information including each information according to the peripheral vehicle specific information, the position, the travel speed, the travel direction, and the vehicle to the management center apparatus; the dangerous act resolution apparatus comprises a call part that enables call with the management center apparatus; and the management center apparatus comprises: an output part that outputs information; a call part that enables call with the dangerous act resolution apparatus; and an input part that inputs information.

In the dangerous act resolution system according to the first aspect, the dangerous act detection part is configured to: judge that a dangerous act occurs when a situation in which the vehicle-to-vehicle distance is shorter than the first threshold and the travel speed exceeds the second threshold occurs intermittently within a predetermined time; and transmit dangerous act detection information including each information according to the peripheral vehicle specific information, the position, the travel speed, and the travel direction to the management center apparatus.

In the dangerous act resolution system according to the first aspect, the dangerous act resolution apparatus comprises: a camera part that takes an image of the peripheral vehicle; and an operation part that operates the camera part; the dangerous act resolution apparatus transmits the image data taken by the camera part to the management center apparatus by the operation of the operation part; and the management center apparatus saves the image data for a predetermined period.

In the dangerous act resolution system according to the first aspect, the dangerous act resolution apparatus comprises a output part that informs that a dangerous act occurs when the dangerous act detection part detects a dangerous act of the peripheral vehicle.

In the dangerous act resolution system according to the first aspect, the dangerous act resolution apparatus comprises an operation part that operates to transmit dangerous act detection information including each information according to the peripheral vehicle specific information, the position, the travel speed, and the travel direction to the management center apparatus.

In the dangerous act resolution system according to the first aspect, the dangerous act detection part periodically acquires the position information and the travel direction information detected by the position detection part and the travel direction detection part to transmit those to the management center apparatus.

In the dangerous act resolution system according to the first aspect, the warning output apparatus is an arrow type traffic signal apparatus comprising an arrow type traffic signal part, and the arrow type traffic signal apparatus is configured to: receive the warning output instruction from the management center apparatus; and thereby flicker the arrow for a certain time so as to urge the peripheral vehicle to quit a dangerous act.

In the dangerous act resolution system according to the first aspect, the warning output apparatus is a speaker apparatus that outputs sound, and the speaker apparatus is configured to: receive the warning output instruction information from the management center apparatus; and thereby output a predetermined warning by sound for urging the peripheral vehicle to quit a dangerous act.

In the dangerous act resolution system according to the first aspect, the dangerous act resolution system further comprises an onboard display apparatus that is externally attached to the vehicle and displays information; and the onboard display apparatus displays warning content, when a dangerous act of the peripheral vehicle by the dangerous act detection part is detected.

In the dangerous act resolution system according to the first aspect, the dangerous act resolution system further comprises an onboard speaker apparatus that is externally attached to the vehicle and outputs a sound, and the onboard speaker apparatus outputs warning content as a voice when detecting a dangerous act of the peripheral vehicle by the dangerous act detection part.

In the dangerous act resolution system according to the first aspect, the dangerous act resolution system further comprises an onboard lamp apparatus that is mounted on the vehicle and outputs light; and the onboard lamp apparatus flicker for indicating a warning, when detecting a dangerous act of the peripheral vehicle by the dangerous act detection part.

In the dangerous act resolution system according to the first aspect, the dangerous act resolution apparatus is an onboard apparatus that is already installed in the vehicle.

In the dangerous act resolution system according to the first aspect, the dangerous act resolution system further comprises an onboard radar apparatus that is mounted on the vehicle and measures the vehicle-to-vehicle distance; and the vehicle-to-vehicle distance measurement section is the onboard radar apparatus.

In the dangerous act resolution system according to the first aspect, the acquisition part is a camera part that takes an image of the peripheral vehicle; and the camera part takes the image of the peripheral vehicle located in the rear, side, or front of the vehicle.

In the present invention, it is possible to adopt the mode of the dangerous act resolution apparatus according to the second aspect.

In the present invention, it is possible to adopt the mode of the method of resolving dangerous act according to the third aspect.

In the present invention, it is possible to adopt the mode of the program according to the fourth aspect.

In the present invention, a program for causing a management center apparatus in a dangerous act resolution system to execute predetermined processing, wherein the dangerous act resolution system comprising: a warning output apparatus that outputs a warning; a management center apparatus that is communicably connected to the warning output apparatus and controls the warning output apparatus; and the dangerous act resolution apparatus that is communicably connected to the management center apparatus; is installed in a vehicle; and instructs the management center apparatus to resolve a dangerous act when a dangerous act of a peripheral vehicle traveling around the vehicle is detected, and wherein the program causes the management center apparatus to execute: receiving the dangerous act detection information; thereby selecting the warning output apparatus at a position where the vehicle and the peripheral vehicle pass, due to use of a preset warning output apparatus database, based on the position, the travel speed, and the travel direction of the dangerous act detection information; and transmitting warning output instruction information to the selected warning output apparatus, the warning output instruction information being information for instructing to output a warning including the peripheral vehicle specific information.

The disclosures of the above Patent Literatures are incorporated herein by reference. Within the ambit of the entire disclosure of the present invention (including the claims and the drawings), modifications and adjustments of the exemplary embodiments are possible further based on the basic technical concept thereof. Also, various combinations or selections (non-selections if necessary) of various disclosed elements (including each element of each claim, each element of each exemplary embodiment, each element of each drawing, and the like) are possible within the ambit of the entire disclosure of the present invention. That is, the present invention certainly includes various variations and modifications that can be made by one skilled in the art according to the entire disclosure including the claims, the drawings and the technical concept. Further, as to the numerical values and the numerical ranges described in the present application, any intermediate value, lower numerical value, and small sub-range(s) are taken to be stated even if not explicitly mentioned.

REFERENCE SIGNS LIST

1 Dangerous act resolution system
10 Dangerous act resolution apparatus
11 Communication part
12 Memory part
12a Threshold database
13 Display part
14 Camera part (acquisition part, light intensity detection part)
15 Position detection part
16 Control part
16a Image analysis section (vehicle-to-vehicle distance measurement
section, light intensity analysis section)
16b Travel speed measurement section
16c Travel direction detection section
16d Dangerous act detection section
17 Operation part
18 Output part
19 Call part
20 Management center apparatus
21 Communication part
22 Memory part
23 Control part
24 Call part
25 Output part
26 Input part
30 Road display apparatus (Warning output apparatus)
31 Communication part
32 Memory part
33 Display part
34 Control part
40 Network
50 Arrow type traffic signal apparatus (Warning output apparatus)
51 Communication part
52 Memory part
53 Traffic signal part
54 Control part
60 Road speaker apparatus (Warning output apparatus)
61 Communication part
62 Memory part
63 Speaker part
64 Control part
70 Onboard display apparatus
71 Onboard speaker apparatus
72 Onboard lamp apparatus
73 Onboard radar apparatus (Vehicle-to-vehicle distance measurement part)
80 Dangerous act resolution apparatus
81 Acquisition part
82 Position detection part
83 Vehicle-to-vehicle distance measurement part 84 Travel speed measurement part
85 Travel direction detection part
86 Dangerous act detection part
90 Management center apparatus
100 Warning output apparatus

What is claimed is:

1. A dangerous act resolution system, comprising:
a plurality of warning output apparatuses that outputs a warning;
a management center apparatus that is communicably connected to the warning output apparatuses and controls the warning output apparatuses; and
a dangerous act resolution apparatus that is communicably connected to the management center apparatus; is installed in a vehicle; and instructs the management center apparatus to resolve a dangerous act when a dangerous act of a peripheral vehicle traveling around the vehicle is detected,
wherein the dangerous act resolution apparatus comprises:
an acquisition part that acquires peripheral vehicle specific information for specifying the peripheral vehicle;
a position detection part that detects a position of the vehicle;
a vehicle-to-vehicle distance measurement part that measures a vehicle-to-vehicle distance between the vehicle and the peripheral vehicle;
a travel speed measurement part that measures a travel speed of the vehicle;
a travel direction detection part that detects a travel direction of the vehicle; and
a dangerous act detection part that judges that a dangerous act occurs when a situation in which the vehicle-to-vehicle distance is shorter than a preset first threshold and the travel speed exceeds a preset second threshold occurs within a predetermined time; and transmits dangerous act detection information including information according to the peripheral vehicle specific information, the position, the travel speed and the travel direction to the management center apparatus,
wherein the management center apparatus is configured to: receive the dangerous act detection information; thereby select the warning output apparatus at a position where the vehicle and the peripheral vehicle pass from the plurality of warning output apparatuses, due to use of a preset warning output apparatus database, based on the position, the travel speed, and the travel direction of the dangerous act detection information; and transmit warning output instruction information to the selected warning output apparatus, the warning output instruction information being information for instructing to output a warning including the peripheral vehicle specific information, and
wherein the selected warning output apparatus receives the warning output instruction information; and thereby outputs a warning including the peripheral vehicle specific information.

2. The dangerous act resolution system according to claim 1, wherein the acquisition part is a camera part that takes images of the peripheral vehicles, and the peripheral vehicle specific information is the images.

3. The dangerous act resolution system according to claim 1,
wherein the acquisition part comprises:
a camera part that takes images of the peripheral vehicles; and
an image analysis section that analyzes the image to recognize a vehicle number of the peripheral vehicle, and
wherein the peripheral vehicle specific information is the vehicle number.

4. The dangerous act resolution system according to claim 1, wherein
the dangerous act resolution apparatus further comprises a camera part that takes an image of the peripheral vehicle, and
the vehicle-to-vehicle distance measurement part is an image analysis section that measures the vehicle-to-vehicle distance according to a relative relationship between a preset third threshold and a vehicle size displayed in the image.

5. The dangerous act resolution system according to claim 1, wherein
the management center apparatus is configured to: receive the dangerous act detection information a plurality of times; thereby select the warning output apparatus at a position where the vehicle and the peripheral vehicle pass from the plurality of warning output apparatuses, due to use of a preset warning output apparatus database, based on the position, the travel speed, and the travel direction of the latest dangerous act detection information; and transmit a second warning output instruction information for instructing the selected warning output apparatus to output a warning escalated from the previous time, and
the selected warning output apparatus is configured to: receive the second warning output instruction information; and thereby output the warning escalated from the previous time.

6. The dangerous act resolution system according to claim 1, wherein
the warning output apparatus is an arrow type traffic signal apparatus comprising an arrow type traffic signal part, and
the arrow type traffic signal apparatus is configured to: receive the warning output instruction information from the management center apparatus; and thereby flicker the arrow for a certain time so as to urge the peripheral vehicle to cease a dangerous act.

7. The dangerous act resolution system according to claim 1, wherein
the warning output apparatus is a speaker apparatus that outputs sound, and
the speaker apparatus is configured to: receive the warning output instruction information from the management center apparatus; and thereby output a predetermined warning by sound for urging the peripheral vehicle to cease a dangerous act.

8. A method of resolving dangerous act by using:
a plurality of warning output apparatuses that outputs a warning;
a management center apparatus that is communicably connected to the warning output apparatuses and controls the warning output apparatus; and
a dangerous act resolution apparatus that is communicably connected to the management center apparatus; is installed in a vehicle; and instructs the management center apparatus to resolve a dangerous act when a dangerous act of a peripheral vehicle traveling around the vehicle is detected, wherein the method comprises:
acquiring peripheral vehicle specific information for specifying the peripheral vehicle, in the dangerous act resolution apparatus;
detecting a position of the vehicle, in the dangerous act resolution apparatus;
measuring a vehicle-to-vehicle distance between the vehicle and the peripheral vehicle, in the dangerous act resolution apparatus;
measuring a travel speed of the vehicle, in the dangerous act resolution apparatus;
detecting a travel direction of the vehicle, in the dangerous act resolution apparatus;
judging that a dangerous act occurs when a situation in which the vehicle-to-vehicle distance is shorter than a preset first threshold and the travel speed exceeds a preset second threshold occurs within a predetermined time; and transmitting dangerous act detection information including information according to the peripheral vehicle specific information, the position, the travel speed and the travel direction to the management center apparatus, in the dangerous act resolution apparatus,
receiving the dangerous act detection information; thereby selecting the warning output apparatus at a position where the vehicle and the peripheral vehicle pass from the plurality of warning output apparatuses, due to use of a preset warning output apparatus database, based on the position, the travel speed, and the travel direction of the dangerous act detection information; and transmitting warning output instruction information to the selected warning output apparatus, the warning output instruction information being information for instructing to output a warning including the peripheral vehicle specific information, in the management center apparatus, and
receiving the warning output instruction information; and thereby outputting a warning including the peripheral vehicle specific information, in the selected warning output apparatus.

9. The dangerous act resolution system according to claim 1, wherein the dangerous act detection part judges whether or not a dangerous act occurs, by using: a timer value counting a time after the start of detection of a dangerous act; and an alarm counter value counting a continuation of a situation in which the vehicle-to-vehicle distance is shorter than the first threshold and the travel speed exceeds the second threshold.

10. The dangerous act resolution system according to claim 9, wherein
the dangerous act resolution apparatus further comprises a light intensity detection part that detects a light intensity of the light from the peripheral vehicle, and
the vehicle-to-vehicle distance measurement part is a light intensity analysis part that measures the vehicle-to-vehicle distance according to a relative relationship between a preset fourth threshold and the light intensity.

11. The dangerous act resolution system according to claim 1, wherein
the dangerous act resolution apparatus further comprises a display part that displays information, and
the dangerous act resolution apparatus is installed on the vehicle so that the display part can be seen to the peripheral vehicle.

12. The dangerous act resolution system according to claim 1,
wherein
the dangerous act detection part is configured to: judge that a dangerous act occurs continuously when a situation in which the vehicle-to-vehicle distance is shorter than the first threshold and the travel speed exceeds the second threshold occurs continuously within a predetermined time; and transmit the dangerous act continuation detection information including each information according to the peripheral vehicle specific information, the position, the travel speed, the travel direction, and the vehicle to the management center apparatus;
the dangerous act resolution apparatus comprises a call part that enables call with the management center apparatus; and
the management center apparatus comprises: an output part that outputs information; a call part that enables call with the dangerous act resolution apparatus; and an input part that inputs information.

13. The dangerous act resolution system according to claim 1, wherein the dangerous act detection part is configured to: judge that a dangerous act occurs when a situation in which the vehicle-to-vehicle distance is shorter than the first threshold and the travel speed exceeds the second threshold occurs intermittently within a predetermined time; and transmit dangerous act detection information including each information according to the peripheral vehicle specific information, the position, the travel speed, and the travel direction to the management center apparatus.

14. The dangerous act resolution system according to claim 1, wherein
the dangerous act resolution apparatus comprises: a camera part that takes an image of the peripheral vehicle; and an operation part that operates the camera part;
the dangerous act resolution apparatus transmits the image data taken by the camera part to the management center apparatus by the operation of the operation part; and
the management center apparatus saves the image data for a predetermined period.

15. The dangerous act resolution system according to claim 1, wherein the dangerous act resolution apparatus comprises a output part that informs that a dangerous act occurs when the dangerous act detection part detects a dangerous act of the peripheral vehicle.

16. The dangerous act resolution system according to claim 1, wherein the dangerous act resolution apparatus comprises an operation part that operates to transmit dangerous act detection information including each information according to the peripheral vehicle specific information, the position, the travel speed, and the travel direction to the management center apparatus.

17. The dangerous act resolution system according to claim 1, wherein
the dangerous act resolution system further comprises an onboard display apparatus that is externally attached to the vehicle and displays information; and
the onboard display apparatus displays warning content, when a dangerous act of the peripheral vehicle by the dangerous act detection part is detected.

18. The dangerous act resolution system according to claim 1, wherein
the dangerous act resolution system further comprises an onboard speaker apparatus that is externally attached to the vehicle and outputs a sound; and the onboard speaker apparatus outputs warning content as a voice when detecting a dangerous act of the peripheral vehicle by the dangerous act detection part.

19. The dangerous act resolution system according to claim 1, wherein the dangerous act resolution system further comprises an onboard lamp apparatus that is mounted on the vehicle and outputs light; and the onboard lamp apparatus flickers for indicating a warning, when detecting a dangerous act of the peripheral vehicle by the dangerous act detection part.

* * * * *